United States Patent
Ueda

(10) Patent No.: US 11,396,290 B2
(45) Date of Patent: Jul. 26, 2022

(54) TRAVEL ASSISTANCE METHOD AND TRAVEL ASSISTANCE DEVICE

(71) Applicant: Nissan Motor Co., Ltd., Yokohama (JP)

(72) Inventor: Hirotoshi Ueda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 202 days.

(21) Appl. No.: 16/633,932

(22) PCT Filed: Jul. 27, 2017

(86) PCT No.: PCT/JP2017/027316
§ 371 (c)(1),
(2) Date: Jan. 24, 2020

(87) PCT Pub. No.: WO2019/021437
PCT Pub. Date: Jan. 31, 2019

(65) Prior Publication Data
US 2020/0317193 A1    Oct. 8, 2020

(51) Int. Cl.
*B60W 30/10* (2006.01)
*G01C 21/30* (2006.01)
*G08G 1/16* (2006.01)

(52) U.S. Cl.
CPC ............. *B60W 30/10* (2013.01); *G01C 21/30* (2013.01); *G08G 1/16* (2013.01)

(58) Field of Classification Search
CPC .... B60W 30/10; B60W 60/001; B60W 30/14; B60W 40/02; B60W 40/105;
(Continued)

(56) References Cited

U.S. PATENT DOCUMENTS 5,646,850 A * 7/1997 Ishida .................. B60K 31/047
123/352
10,310,503 B2 * 6/2019 Oyama ................ G05D 1/0274
(Continued)

FOREIGN PATENT DOCUMENTS

JP    2006126980 A    5/2006
JP    2014211862 A    11/2014
(Continued)

OTHER PUBLICATIONS

Hayakawa Yasuhisa; Kimura Takeshi; English translation of JP 2006126980 (Year: 2006).*

*Primary Examiner* — Abby Y Lin
*Assistant Examiner* — Danielle Marie Jackson
(74) *Attorney, Agent, or Firm* — Young Basile Hanlon & MacFarlane, P.C.

(57) ABSTRACT

A travel assistance method capable of preventing irregular behavior of a vehicle when switching from a traveling path on which the vehicle is currently traveling to a traveling path based on a high-definition map, generates a first traveling path based on the surroundings of the vehicle, generates a second traveling path based on high-definition map information around the circumference of the vehicle, determines whether the first traveling path and the second traveling path have likeness, and switches the traveling path that the vehicle is caused to follow by executing traveling assistance control when the first traveling path and the second traveling path have likeness.

10 Claims, 13 Drawing Sheets

(58) Field of Classification Search
CPC .......... B60W 2520/10; B60W 2556/40; G01C 21/30; G01C 21/3415; G01C 21/34; G08G 1/16; G05D 1/0212; G05D 2201/0213; B60Y 2300/10; B60Y 2300/14

See application file for complete search history.

(56) References Cited

U.S. PATENT DOCUMENTS

| | | |
|---|---|---|
| 2014/0297093 A1 | 10/2014 | Murai et al. |
| 2016/0272243 A1 | 9/2016 | Matsuno et al. |
| 2017/0123434 A1 | 5/2017 | Urano et al. |
| 2017/0197634 A1 | 7/2017 | Sato |
| 2017/0242441 A1 | 8/2017 | Nakaya et al. |
| 2018/0310461 A1* | 11/2018 | Shinkai ................ A01B 69/008 |
| 2019/0197903 A1* | 6/2019 | Ferguson ............... G08G 1/166 |
| 2019/0316927 A1* | 10/2019 | Pu ........................ G01C 21/362 |

FOREIGN PATENT DOCUMENTS

| | | |
|---|---|---|
| JP | 2016050901 A | 4/2016 |
| JP | 2017087816 A | 5/2017 |
| WO | 2016027394 A1 | 2/2016 |

\* cited by examiner

TRAVEL ASSISTANCE METHOD AND TRAVEL ASSISTANCE DEVICE

TECHNICAL FIELD

The present invention relates to a travel assistance method and a travel assistance device.

BACKGROUND

A technique is known that causes a vehicle to drive manually during traveling around an intersection, for example, determines whether the vehicle is traveling in a presumed traveling lane by automated driving when entering a section enabling the vehicle to travel autonomously, and starts the automated driving when the vehicle is determined to be traveling in the presumed traveling lane (refer to Japanese Patent Unexamined Publication No. 2016-050901).

SUMMARY

The vehicle traveling in the presumed traveling lane still may cause irregular behavior when the current traveling path is switched to a traveling path based on a high-definition map for automated driving, if the current traveling path deviates from the traveling path based on the high-definition map in the corresponding lane.

To solve the above conventional problem, the present invention provides a travel assistance method and a travel assistance device enabling a vehicle to prevent irregular behavior when switching from a traveling path on which the vehicle is currently traveling to a traveling path based on a high-definition map.

An aspect of the present invention provides a travel assistance device and a travel assistance method for detecting surroundings of a host vehicle, generating a first traveling path based on the surroundings, and executing travel assistance control of the host vehicle based on the first traveling path, the travel assistance device and the travel assistance method being configured to generate a second traveling path based on high-definition map information around a circumference of the host vehicle, determine whether the first traveling path and the second traveling path have likeness, and switch a traveling path that the host vehicle is caused to follow by the travel assistance control from the first traveling path to the second traveling path when the first traveling path and the second traveling path are determined to have likeness.

DETAILED DESCRIPTION

Figure 1:
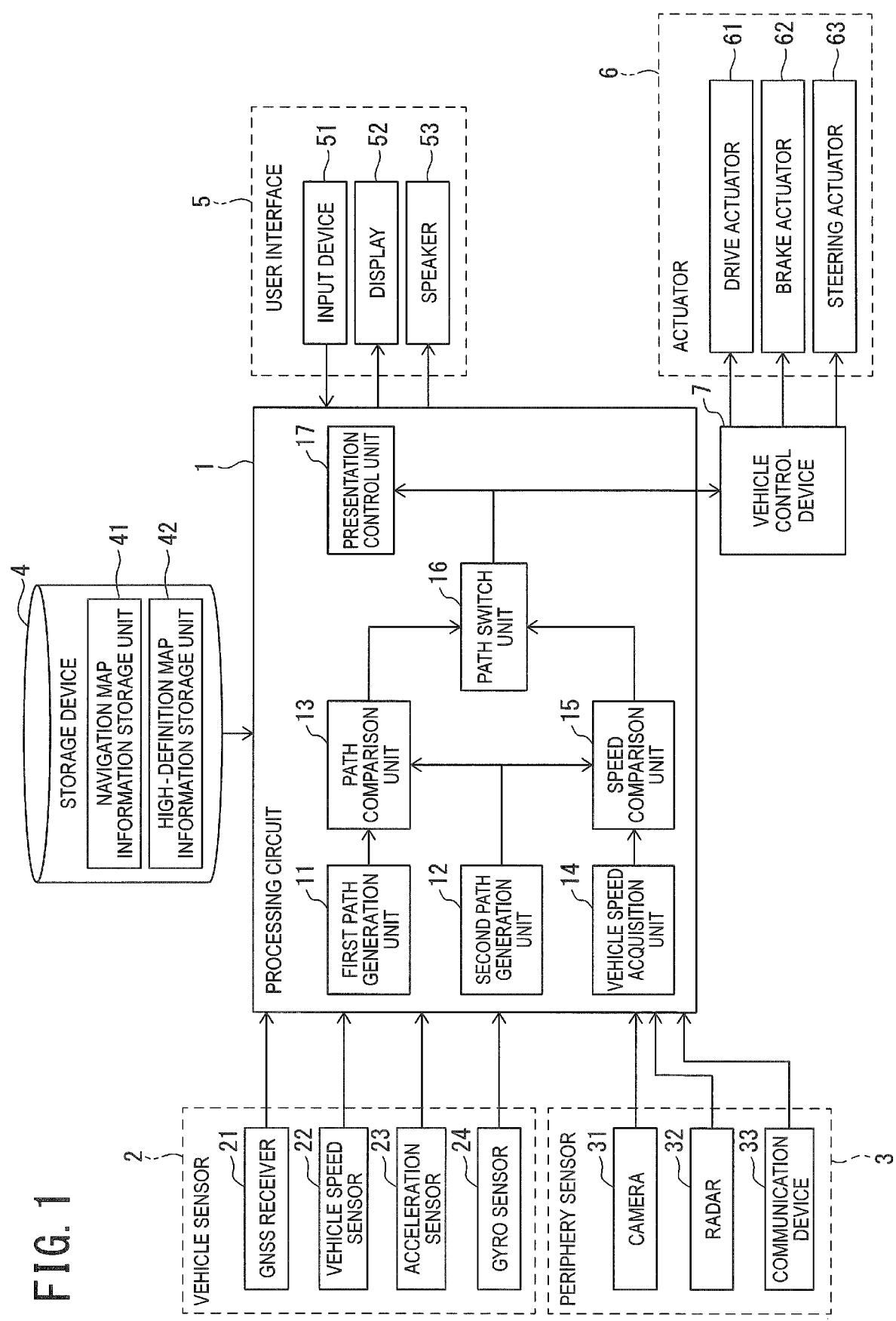
FIG. 1 is a block diagram illustrating a travel assistance device according to an embodiment of the present invention.

Hereinafter, an embodiment according to the present invention will be described with reference to the drawings. In the descriptions of the drawings below, the same or similar elements are indicated by the same or similar reference numerals. It should be understood that the drawings are illustrated schematically, and are not drawn to scale. The embodiment described below illustrates a device and a method for embodying the technical ideas of the present invention which are not intended to be limited to the structures or arrangements of the elements as described herein. The technical ideas of the present invention are to cover various modifications falling within the scope of the invention as defined by the appended claims.

(Travel Assistance Device)

A travel assistance device according to the embodiment of the present invention is mounted on a vehicle (hereinafter, a vehicle on which the travel assistance device according to the embodiment of the present invention is mounted is referred to as a "host vehicle"). The travel assistance device according to the embodiment of the present invention can execute travel assistance processing, including autonomous driving which controls the host vehicle to autonomously travel along a traveling path, and a guide to urge a driver to cause the host vehicle to travel along the traveling path. The autonomous driving includes both cases of executing all of driving, braking, and steering operations of the host vehicle without the occupant (driver) involved in any operation, and executing at least one of the driving, braking, and steering operations. The autonomous driving may execute any of preceding vehicle following control, distance-to-vehicle control, and lane deviation prevention control, for example. The manual driving refers to a state of driving by the operation of the driver while the travel assistance device according to the embodiment of the present invention does not perform any of the driving, braking, and steering operations on the host vehicle.

The travel assistance device according to the embodiment of the present invention includes a traveling path switch determination device (processing circuit) 1, a vehicle sensor 2, a periphery sensor 3, a storage device 4, a user interface (I/F) 5, an actuator 6, and a vehicle control device 7. The processing circuit 1, the vehicle sensor 2, the periphery sensor 3, the storage device 4, the user I/F 5, the actuator 6, and the vehicle control device 7 can communicate with each other so as to transfer and receive data and signals in a wired manner such as a controller area network (CAN) bus or in a wireless manner.

The vehicle sensor 2 detects a current position and a traveling state of the host vehicle. The vehicle sensor 2 includes a global navigation satellite system (GNSS) receiver 21, a vehicle speed sensor 22, an acceleration sensor 23, and a gyro sensor 24. The types and number of the vehicle sensor 2 are not limited to the above case. The GNSS receiver 21 is a global positioning system (GPS) receiver, for example, which receives radio waves from a plurality of navigation satellites to acquire a current position of the host vehicle, and outputs the acquired current position of the host vehicle to the processing circuit 1. The vehicle speed sensor 22 detects a wheel speed of the host vehicle, detects a vehicle speed based on the detected wheel speed, and outputs the detected vehicle speed to the processing circuit 1. The acceleration sensor 23 detects acceleration in the front-rear direction of the host vehicle and the vehicle width direction, for example, and outputs the detected acceleration to the processing circuit 1. The gyro sensor 24 detects an angular velocity of the host vehicle, and outputs the detected angular velocity to the processing circuit 1.

The periphery sensor 3 detects the surroundings (surrounding conditions) of the host vehicle including the conditions of the front side of the host vehicle. The periphery sensor 3 includes a camera 31, a radar 32, and a communication device 33. The types and number of the periphery sensor 3 are not limited to the above case. The camera 31 can be a CCD camera, for example. The camera 31 may be either a monocular camera or a stereo camera. The camera 31 captures the surroundings of the host vehicle, detects data of the surroundings of the host vehicle from a captured image, including a relative position between the host vehicle and an object such as vehicles (other vehicles) such as a preceding vehicle, a pedestrian or a bicycle, a distance between the object and the host vehicle, and a road structure such as lane boundaries (white lines) on a road, and outputs the detected data of the surroundings to the processing circuit 1.

The radar 32 can be a millimeter-wave radar, an ultrasonic-wave radar, or a laser rangefinder (LRF), for example. The radar 32 detects data of the surroundings of the host vehicle, such as a relative position between an object and the host vehicle, a distance between the object and the host vehicle, and a relative speed between the object and the vehicle, and outputs the detected data of the surroundings to the processing circuit 1. The communication device 33 receives data of the surroundings such as positions of other vehicles and speeds of other vehicles through vehicle-to-vehicle communications with other vehicles, road-to-vehicle communications with a road side unit, or communications with a traffic information center, for example, and outputs the detected data of the surroundings to the processing circuit 1.

The storage device 4 can be a semiconductor memory, a magnetic memory, or an optical memory, for example, and may be included in the processing circuit 1. The storage device 4 includes a navigation map information storage unit 41 for storing map information for navigation (hereinafter referred to as "navigation map information"), and a high-definition map information storage unit 42 for storing high-definition map information. A database of the navigation map information and the high-definition map information may be controlled in a server, and difference data of the navigation map information and the high-definition map information after being updated may be acquired through telematics, so as to update the navigation map information stored in the navigation map information storage unit 41 and the high-definition map information stored in the high-definition map information storage unit 42. Alternatively, the navigation map information and the high-definition map information may be acquired through vehicle-to-vehicle communications or road-to-vehicle communications depending on the position at which the host vehicle is traveling. The use of telematics (vehicle-to-vehicle communications or road-to-vehicle communications) eliminates the necessity of storing the navigation map information and the high-definition map information requiring a large volume of data, so as to save the capacity of memory. The use of telematics (vehicle-to-vehicle communications or road-to-vehicle communications) further enables the acquisition of the navigation map information and the high-definition map information to be updated, so as to accurately recognize actual traveling conditions such as a change in road structure and the presence or absence of road repair or construction. The use of telematics (vehicle-to-vehicle communications or road-to-vehicle communications) also enables the acquisition of the precise navigation map information and high-definition map information generated on the basis of data gathered from plural vehicles other than the host vehicle.

The navigation map information stored in the navigation map information storage unit 41 includes pieces of information per road. Examples of information per road included in the navigation map information include road nodes indicating reference points on a road reference line (such as a center line of a road), and road links indicating sectional aspects between the respective road nodes. The information on the road nodes includes a corresponding identification number, positional coordinates, the number of road links to be connected with, and an identification number of the respective road links to be connected with. The information on the road links includes a corresponding identification number, a road attribute, a link length, the number of lanes, a road width, and a speed limit. The navigation map information does not include lane information. The navigation map information stored in the navigation map information storage unit 41 is presumed not to include information per lane which is more specific than the information per road.

The high-definition map information stored in the high-definition map information storage unit 42 is map information more precise than the navigation map information, and includes pieces of information per lane more specific than the information per road. Examples of information per lane included in the high-definition map information include lane nodes indicating reference points on a lane reference line (such as a middle line in a lane), and lane links indicating sectional aspects between the respective lane nodes. The information on the lane nodes includes a corresponding identification number, positional coordinates, the number of lane links to be connected with, and an identification number of the respective lane links to be connected with. The information on the lane links includes a corresponding identification number, a lane type, a lane width, a type of lane boundary, a lane shape, and a shape of a lane reference line. The high-definition map information further includes information on objects on the ground, such as the type and positional coordinates of objects on the ground including a traffic signal, a stop line, a sign, a building, a telegraph pole, a curb, and a crosswalk present on or around lanes, and the identification number of each lane node and the identification number of each lane link corresponding to the positional coordinates of the objects on the ground.

Since the high-definition map includes the information on the nodes and links per lane, the lane in which the host vehicle is currently traveling on the traveling path can be specified. The high-definition map has coordinates indicative of each position in the extending direction and the width direction of each lane. The high-definition map also has coordinates indicative of each position in a three-dimensional space (such as a longitude, a latitude, and an altitude), and each lane and the above objects on the ground can be indicated by the respective shapes in a three-dimensional space.

The processing circuit 1 and the vehicle control device 7 each serve as a controller such as an electronic control unit (ECU) for performing arithmetic logic operations necessary for the respective operations of the travel assistance device according to the embodiment of the present invention, and may include a processor, a storage device, and an input-output I/F. The processor may be a microprocessor equivalent to a central processing unit (CPU), for example, including an arithmetic logic unit (ALU), a control circuit (control device), and various types of registers. The internal or external storage device included in each of the processing circuit 1 and the vehicle control device 7 may be a semiconductor memory or a disk medium, for example, and may include a register, a cache memory, and a storage medium such as a ROM or a RAM as a main storage device. For example, the processor can execute a program (a travel assistance program) preliminarily stored in the storage device and including a series of processing necessary for the operations of the travel assistance device according to the embodiment of the present invention.

The processing circuit 1 includes logic blocks as functional or physical hardware resources, such as a first path generation unit 11, a second path generation unit 12, a path comparison unit 13, a vehicle speed acquisition unit 14, a speed comparison unit 15, a path switch unit 16, and a presentation control unit 17. These logic blocks may physically implement a programmable logic device (PLD) such as a field-programmable gate array (FPGA), or may implement a functional logic circuit equivalently set by processing of software in a general-purpose semiconductor integrated circuit.

The first path generation unit 11, the second path generation unit 12, the path comparison unit 13, the vehicle speed acquisition unit 14, the speed comparison unit 15, the path switch unit 16, and the presentation control unit 17 included in the processing circuit 1 may be implemented by a single piece of hardware, or may each be implemented by individual hardware. The vehicle control device 7 may be included in the processing circuit 1. The processing circuit 1 may be implemented by a car navigation system such as an in-vehicle infotainment (IVI) system, and the vehicle control device 7 may be implemented by a travel assistance system such as an advanced driver-assistance system (ADAS).

The first path generation unit 11 generates a first traveling path P1 at least based on the surroundings of the host vehicle detected by the periphery camera 3. The first traveling path P1 is a possibility as a traveling path when performing the travel assistance control on the host vehicle. For example, when performing the preceding vehicle following control on the host vehicle, the first path generation unit 11 calculates a traveling trajectory of a preceding vehicle detected by the periphery sensor 3, and generates the first traveling path using the calculated traveling trajectory of the preceding vehicle (car following path: CFP). For example, a trajectory following the central position in the vehicle width direction of the preceding vehicle is calculated as the traveling trajectory of the preceding vehicle. The first traveling path based on the traveling trajectory of the preceding vehicle is set to have a length of about 100 meters, for example, and is successively updated as the preceding vehicle advances. The first path generation unit 11 may directly use the traveling trajectory of the preceding vehicle to generate the first traveling path, or may generate the first traveling path P1 based on an offset trajectory shifted from the traveling trajectory of the preceding vehicle in the width direction of the lane.

When not performing the preceding vehicle following control on the host vehicle, the first path generation unit 11 may refer to the navigation map information stored in the navigation map information storage unit 41 so as to generate the first traveling path. For example, the first path generation unit 11 sets a destination in the navigation map information stored in the navigation map information storage unit 41 in accordance with directional information input by the occupant. The first path generation unit 11 searches for a presumed traveling route from a current position (start position) to a destination of the host vehicle in the navigation map information stored in the navigation map information storage unit 41 by Dijkstra's algorithm. The first path generation unit 11 generates the first traveling path along the middle in the lane, for example, based on the surroundings of the host vehicle such as positions of lane boundaries detected by the periphery sensor 3 so as to lead the host vehicle to follow the searched presumed traveling route to go straight or make a right or left turn.

The first path generation unit 11 may calculate a target trajectory based on the surroundings of the host vehicle such as the positions of the lane boundaries detected by the periphery sensor 3, without referring to the navigation map information stored in the navigation map information storage unit 41, so as to generate the first traveling path using the calculated target trajectory. The first path generation unit 11 may generate the first traveling path within a predetermined section from the current position of the host vehicle to a position having a predetermined distance from the current position. The predetermined section can be set as appropriate within a range enabling the periphery sensor 3 to detect the surroundings necessary for the travel assistance control for the host vehicle.

The second path generation unit 12 generates a second traveling path (navigation drive path; NDP) at least based on the high-definition map information stored in the high-definition map information storage unit 42. The second traveling path is a possibility as a traveling path when performing the travel assistance control on the host vehicle. For example, the second path generation unit 12 specifies the position of the host vehicle on the high-definition map, based on the high-definition map information stored in the high-definition map information storage unit 42 and the surroundings of the host vehicle such as a road structure detected by the periphery sensor 3, so as to generate the second traveling path drawn within the lane on the basis of the position of the host vehicle. The second traveling path generated may pass through the middle in the lane.

The second path generation unit 12 may generate the second traveling path so as to lead the host vehicle to follow the presumed traveling route to go straight or make a right or left turn within a section on the presumed traveling route from the start position to the destination in the navigation map information stored in the navigation map information storage unit 41. The second path generation unit 12 may generate the second traveling path within a predetermined section from the current position of the host vehicle to a position having a predetermined distance from the current position. The predetermined section can be set as appropriate within a range that the high-definition map information covers.

Figure 2A:
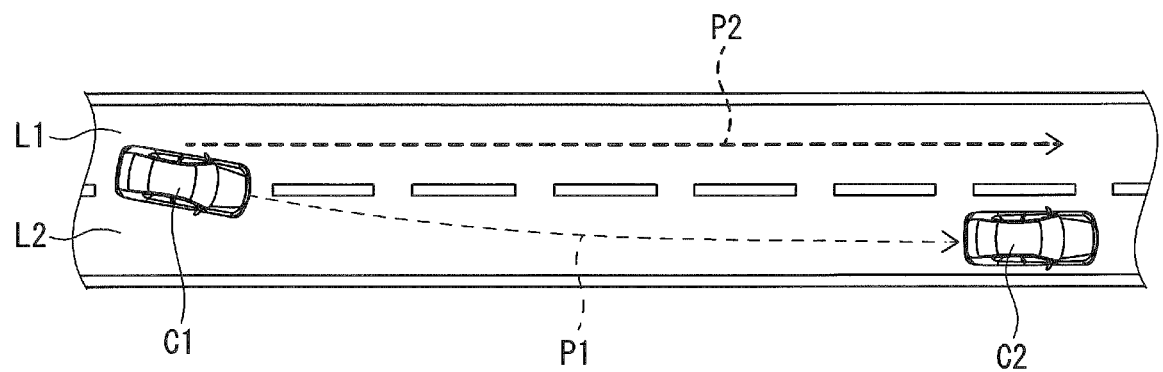
FIG. 2A is a schematic diagram illustrating a case of switching traveling paths when changing lanes.

An example of the travel assistance control by the travel assistance device according to the embodiment of the present invention is described below with reference to FIG. 2A to FIG. 2C. As illustrated in FIG. 2A, the host vehicle C1 is controlled to follow the preceding vehicle C2 on a two-lane road including lanes L1 and L2 parallel to each other and extending in the same direction, and is changing from the lane L1 on the left side to the lane L2 on the right side. The traveling path to follow is presumed to be switched from the first traveling path P1 based on the traveling trajectory of the preceding vehicle C2 to the second traveling path P2 based on the high-definition map.

The first traveling path P1 is generated in the lane L2 on the right side, and the second traveling path P2 is generated in the lane L1 on the left side. The first traveling path P1 deviates from the second traveling path P2 to have no likeness to each other (determination of likeness between the first traveling path P1 and the second traveling path P2 is described below). Since switching from the first traveling path P1 to the second traveling path P2 at this point would cause irregular behavior of the host vehicle C1 such as wandering, the processing of switching from the first traveling path P1 to the second traveling path P2 is thus on standby at the timing illustrated in FIG. 2A.

Figure 2B:
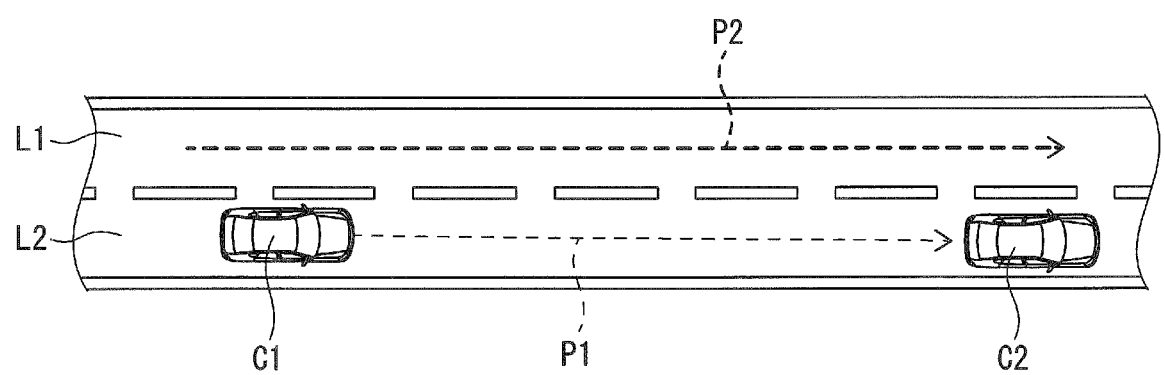
FIG. 2B is a schematic diagram, continued from FIG. 2A, illustrating the case of switching the traveling paths.

As illustrated in FIG. 2B, the host vehicle C1 makes a lane change from the lane L1 on the left side to the lane L2 on the right side. The first traveling path P1 is generated in the lane L2 on the right side, and the second traveling path P2 is generated in the lane L1 on the left side. Since the first traveling path P1 has no likeness to the second traveling path P2, the processing of switching from the first traveling path P1 to the second traveling path P2 is still on standby at the timing illustrated in FIG. 2B.

Figure 2C:
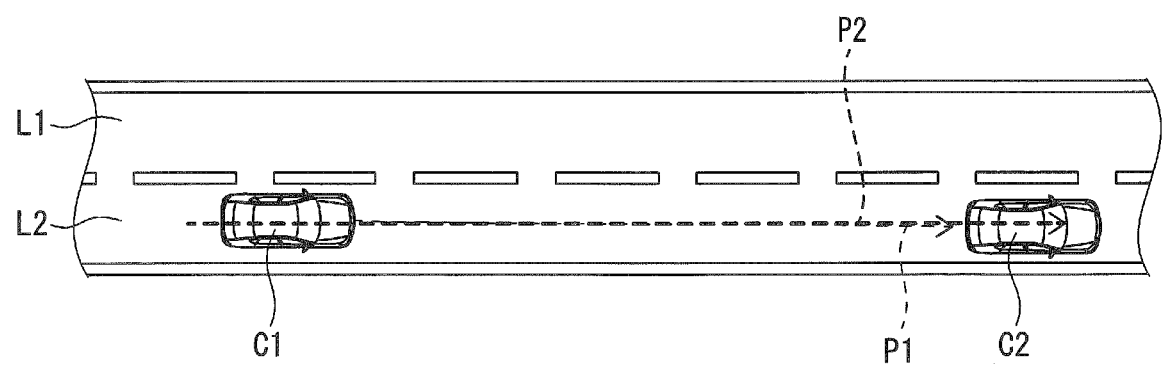
FIG. 2C is a schematic diagram, continued from FIG. 2B, illustrating the case of switching the traveling paths.

As illustrated in FIG. 2C, the second traveling path P2 is then generated in the lane L2 on the right side due to the lane change of the host vehicle C1 to the lane L2 on the right side. The processing of switching from the first traveling path P1 to the second traveling path P2 is thus executed when the deviation between the first traveling path P1 and the second traveling path P2 decreases to lead the respective paths generated in the same lane L2 to have likeness to each other. This processing can prevent irregular behavior of the host vehicle C1 such as wandering upon the switch from the first traveling path P1 to the second traveling path P2.

The path comparison unit 13 illustrated in FIG. 1 compares the first traveling path P1 generated by the first path generation unit 11 with the second traveling path P2 generated by the second path generation unit 12, and determines whether the first traveling path P1 and the second traveling path P2 have likeness to each other. As used in the embodiment of the present invention, the term "likeness" embraces the meaning of "sameness". The determination that the first traveling path P1 and the second traveling path P2 have likeness thus encompasses a case in which the first traveling path P1 and the second traveling path P2 conform to each other and are completely the same.

For example, the path comparison unit 13 may determine whether a gap between the first traveling path P1 and the second traveling path P2 is less than a predetermined threshold so as to make a determination of whether the first traveling path P1 and the second traveling path P2 have likeness in shape. In particular, the path comparison unit 13 may determine that the first traveling path P1 and the second traveling path P2 have no likeness when the gap between the first traveling path P1 and the second traveling path P2 is the predetermined threshold or greater, and determine that the first traveling path P1 and the second traveling path P2 have likeness when the gap between the first traveling path P1 and the second traveling path P2 is less than the predetermined threshold. The predetermined threshold can be set as appropriate, and may be preliminarily stored in the storage device 4, for example.

Figure 3:
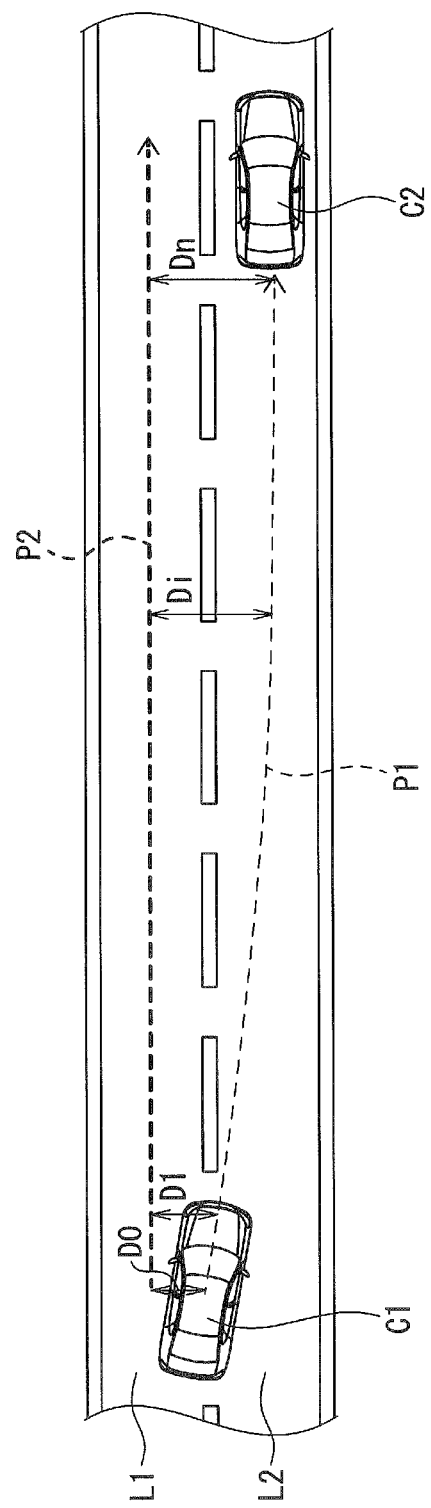
FIG. 3 is a schematic diagram illustrating an example of likeness determination processing.

For example, as illustrated in FIG. 3, the path comparison unit 13 calculates the shortest distance $D_i$ ($i=0$ to $n$: $n$ is a positive number) between the first traveling path P1 and the second traveling path P2 at each point in the entire section of either the first traveling path P1 or the second traveling path P2 having a shorter distance ahead of the host vehicle C1, which is the first traveling path P1 in this case (the entire section in which the first traveling path P1 and the second traveling path P2 overlap with each other), and determines whether all the calculated shortest distances $D_i$ are less than a predetermined threshold $D_t$. The path comparison unit 13 determines that the first traveling path P1 and the second traveling path P2 have likeness when all the shortest distances $D_i$ are less than the predetermined threshold $D_t$, and determines that the first traveling path P1 and the second traveling path P2 have no likeness when at least one of the shortest distances $D_i$ is the predetermined threshold $D_t$ or greater. The number of points at which the shortest distances $D_i$ are calculated can be infinite since the larger number increases the accuracy in determination, or may be calculated with a finite number at predetermined intervals in view of calculation load. The first traveling path P1 and the second traveling path P2 are determined to have likeness when all the shortest distances are less than the predetermined threshold $D_t$ regardless of whether the first traveling path P1 is meandering, for example.

Figure 4:
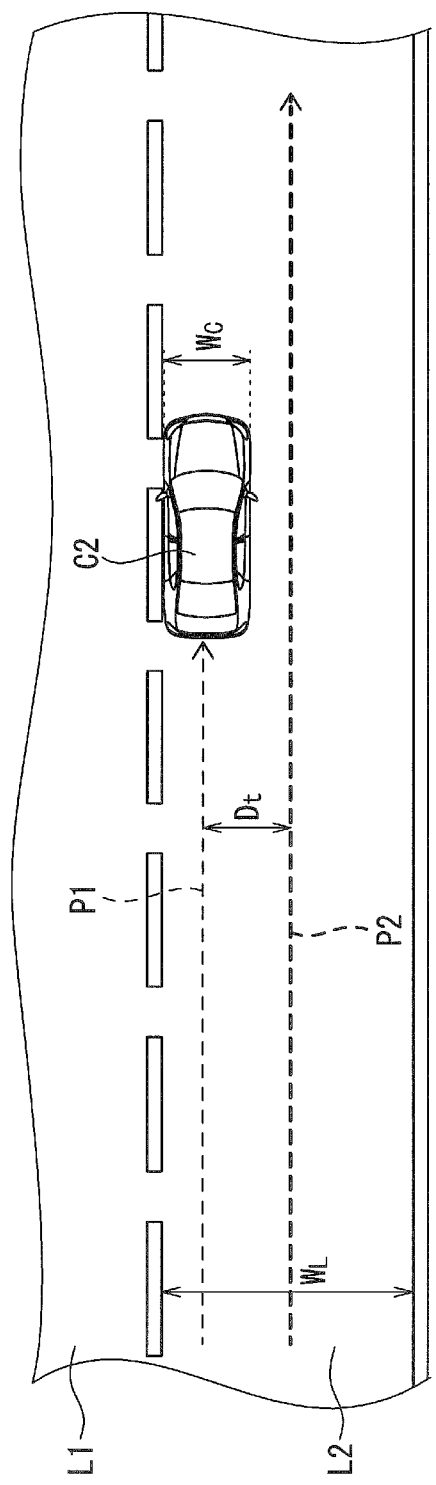
FIG. 4 is a schematic diagram illustrating an example of likeness determination processing.

The predetermined threshold $D_t$ to be compared with the shortest distance $D_i$ can be calculated in accordance with the following equation (1) so as to be a value essential in determining that both paths are within the same lane L2:

$$D_t = W_L/2 - W_C/2 \qquad (1)$$

where $W_L$ is a width of the lane L2, and $W_C$ is a width of the preceding vehicle C2, as illustrated in FIG. 4.

As compared with the case illustrated in FIG. 3, when the second traveling path P2 has a shorter length than the first traveling path P1, the shortest distance $D_1$ between the first traveling path P1 and the second traveling path P2 at each point may be calculated in the entire section of the second traveling path P2. Instead of the calculation of the shortest distances $D_i$ in the entire section in which the first traveling path P1 and the second traveling path P2 overlap with each other, the shortest distances $D_i$ may be calculated within a predetermined section from the front end to a predetermined point in front of the farthest end of the overlapping section.

Figure 5:
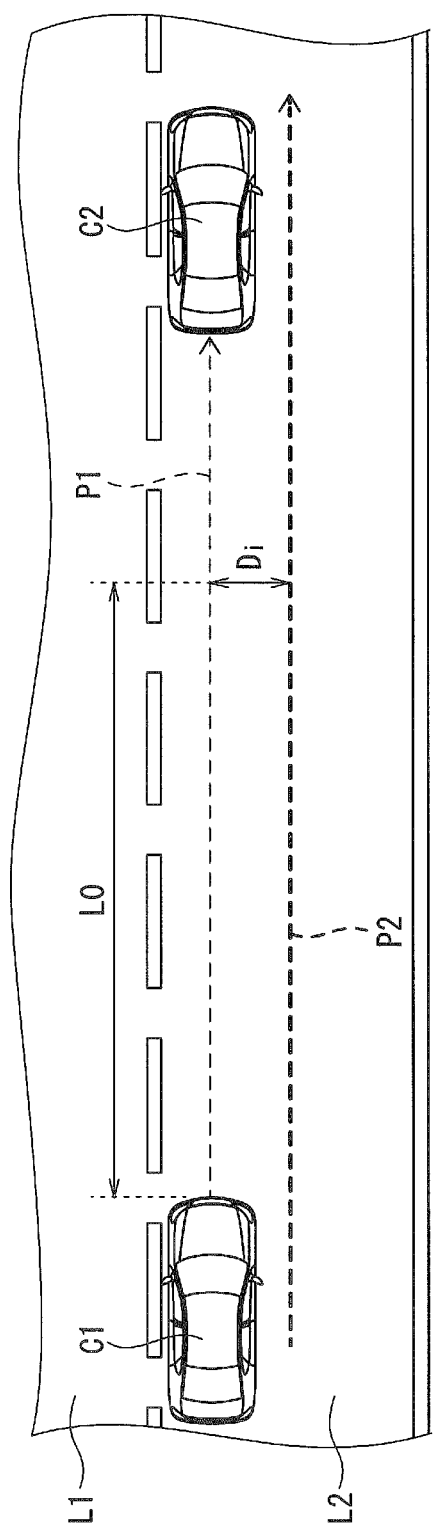
FIG. 5 is a schematic diagram illustrating an example of likeness determination processing.

The path comparison unit 13 may calculate the shortest distances $D_i$ between the first traveling path P1 and the second traveling path P2 within a predetermined section ahead of the host vehicle C1 excluding the current position. For example, as illustrated in FIG. 5, the path comparison unit 13 may calculate the shortest distances Di between the first traveling path P1 and the second traveling path P2 in a section ahead of a front-side gazing point having a distance L0 from the host vehicle C1, excluding a region from the current position of the host vehicle C1 to a point having a distance shorter than the distance L0 of the front-side gazing point. The distance L0 of the front-side gazing point can be calculated such that the speed of the host vehicle C1 is multiplied by a predetermined time constant preliminarily set for the speed of the host vehicle C1, for example. The shortest distance Di may be calculated at a predetermined position or within a predetermined section in a region from a position distant from the host vehicle C1 by the distance L0 of the front-size gazing point to a rear position of the preceding vehicle C2. FIG. 5 illustrates the case of calculating the shortest distance Di at the position distant from the host vehicle C1 by the distance L0 of the front-side gazing point.

The path comparison unit 13 may calculate the predetermined threshold Dt to be compared with the shortest distance Di in accordance with the following equation (2):

$$Dt = L0 \times Vs/V \quad (2)$$

where L0 is the distance of the front-side gazing point as a control target point when following the traveling path, V is the current speed of the host vehicle C1, and Vs is a lateral movement speed as behavior of the host vehicle C1 allowable upon the switch of the traveling path (Vs=0.2 m/s, for example).

When at least one of the first traveling path P1 and the second traveling path P2 has a length shorter than a predetermined threshold (10 meters, for example), the path comparison unit 13 may determine that the first traveling path P1 and the second traveling path P2 have no likeness, since the determination of likeness between the first traveling path P1 and the second traveling path P2 cannot be ensued accurately. For example, the length of the first traveling path P1 typically decreases when the host vehicle C1 is coming close to the preceding vehicle C2. The length of the second traveling path P2 may decrease around an edge of a range that the high-definition map information covers.

Figure 6A:
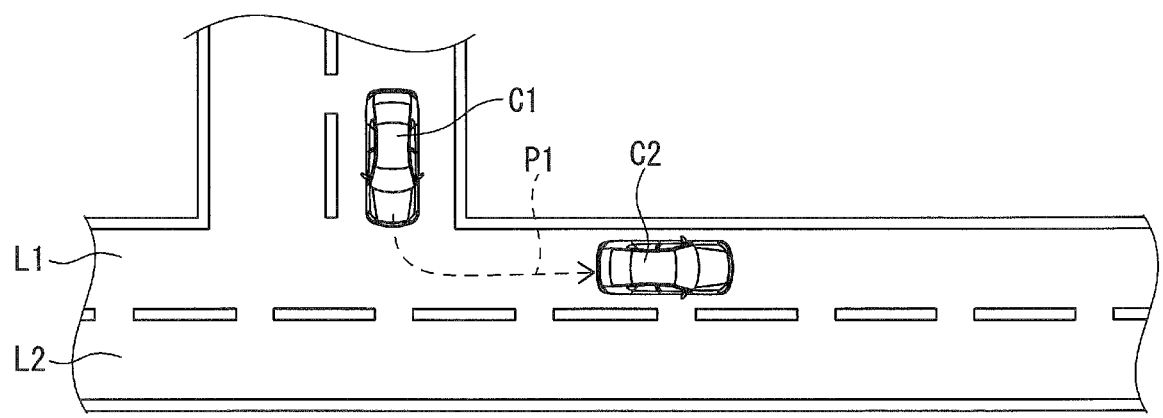
FIG. 6A is a schematic diagram illustrating a case of switching traveling paths when making a turn.
Figure 6B:
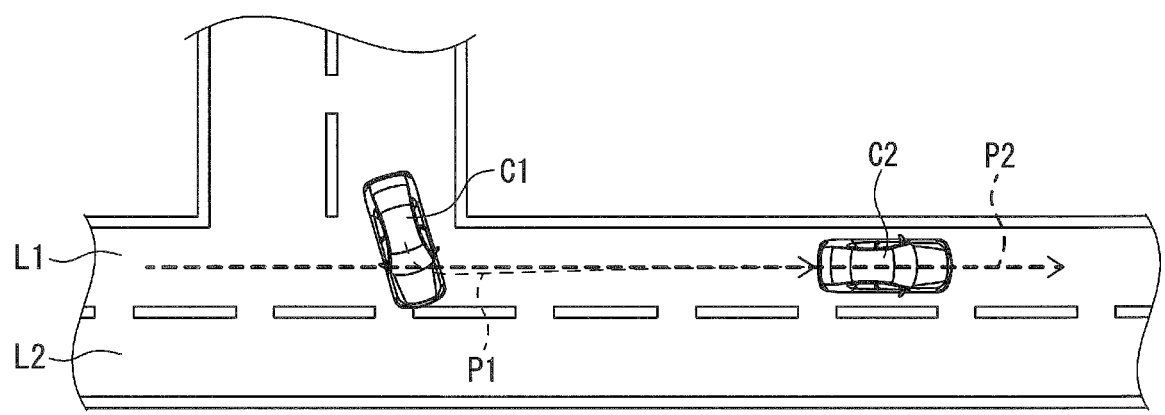
FIG. 6B is a schematic diagram, continued from FIG. 6A, illustrating the case of switching the traveling paths.
Figure 6C:
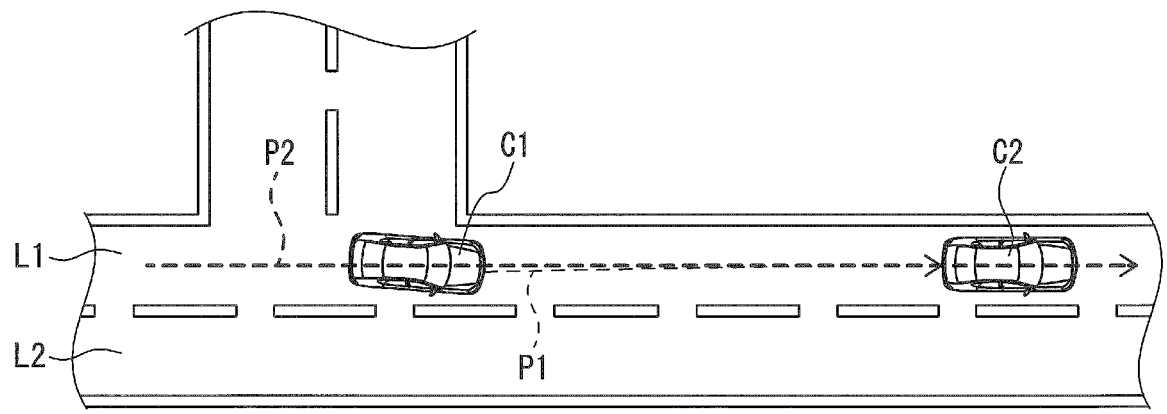
FIG. 6C is a schematic diagram, continued from FIG. 6B, illustrating the case of switching the traveling paths.

Another example of the travel assistance control by the travel assistance device according to the embodiment of the present invention is described below with reference to FIG. 6A to FIG. 6C. FIG. 6A illustrates a case in which the host vehicle C1 is following the preceding vehicle C2 and is turning to the left at an intersection (T-intersection) so as to enter the lane L1. The traveling path to follow is presumed to be switched from the first traveling path P1 based on the traveling trajectory of the preceding vehicle C2 to the second traveling path P2 based on the high-definition map. As illustrated in FIG. 6B, switching from the first traveling path P1 to the second traveling path P2 when making a turn causes irregular behavior of the host vehicle C1, since the direction (orientation) of the first traveling path P1 at the current position of the host vehicle C1 deviates from the direction (orientation) of the second traveling path P2. The travel assistance device according to the embodiment of the present invention thus executes the processing of switching from the first traveling path P1 to the second traveling path P2 after the first traveling path P1 and the second traveling path P2 are determined to have likeness, as illustrated in FIG. 6C.

Figure 7:
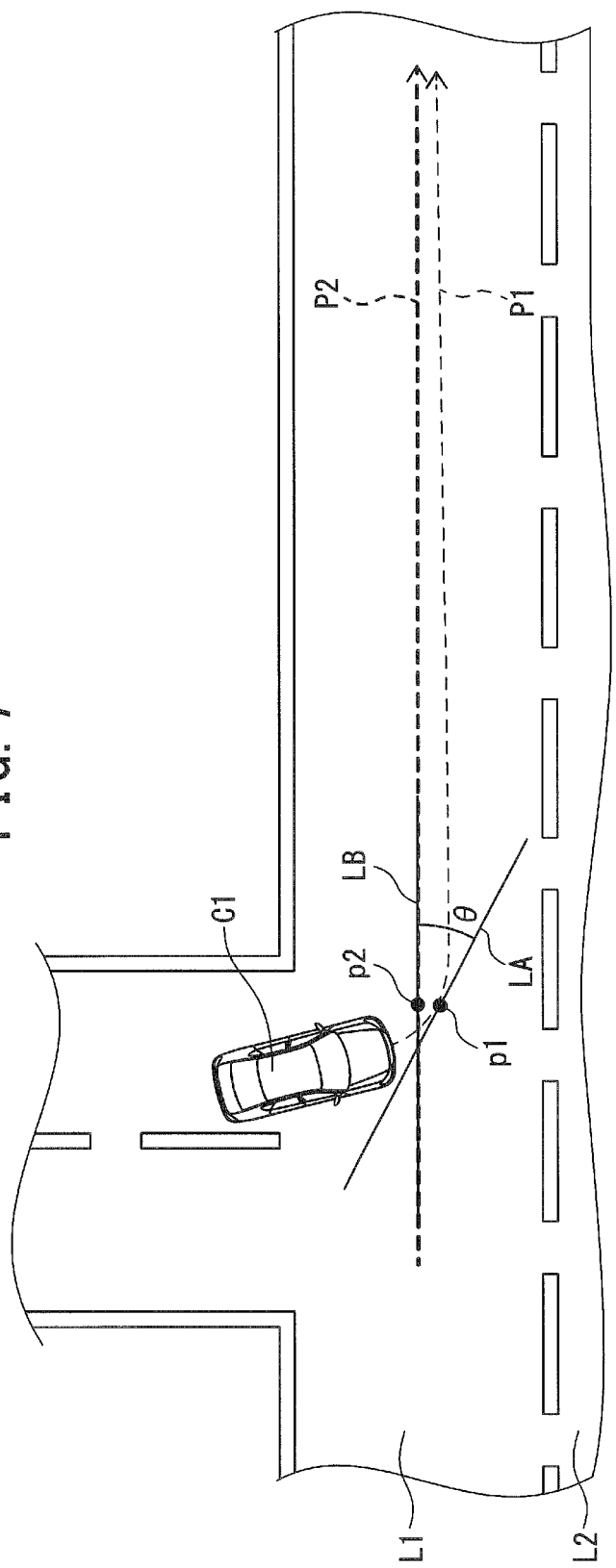
FIG. 7 is a schematic diagram illustrating an example of likeness determination processing when making a turn.

The path comparison unit 13 may determine whether the respective directions (orientations) of the first traveling path P1 and the second traveling path P2 have likeness to each other so as to make a determination of whether the first traveling path P1 and the second traveling path P2 have likeness in shape. For example, as illustrated in FIG. 7, the path comparison unit 13 determines that the first traveling path P1 and the second traveling path P2 have likeness when an angle θ between a tangent LA to the first traveling path P1 at a point p1 and a tangent LB to the second traveling path P2 at a point p2, the two points having the shortest distance to each other at a predetermined overlapping position between the first traveling path P1 and the second traveling path P2, is less than a predetermined threshold θt, and determines that the first traveling path P1 and the second traveling path P2 have no likeness when the angle θ is the predetermined threshold θt or greater. The predetermined threshold θt can be set as appropriate, and may be preliminarily stored in the storage device 4, for example. When the angle θ is calculated at plural positions at which the first traveling path P1 and the second traveling path P2 approximate to each other, the path comparison unit 13 may determine that the first traveling path P1 and the second traveling path P2 have likeness when all the angles θ are less than the predetermined threshold θt, and determine that the first traveling path P1 and the second traveling path P2 have no likeness when any of the angles θ is the predetermined threshold θt or greater.

A predetermined section ahead of the host vehicle C1 is set to the entire section of either the first traveling path P1 or the second traveling path P2 having a shorter length. The path comparison unit 13 may determine whether the respective directions of the first traveling path P1 and the second traveling path P2 have likeness at the current position of the host vehicle C1. Alternatively, the path comparison unit 13 may determine whether the respective directions of the first traveling path P1 and the second traveling path P2 have likeness at a point distant from the host vehicle C1 by the distance of the front-side gazing point.

Figure 8:
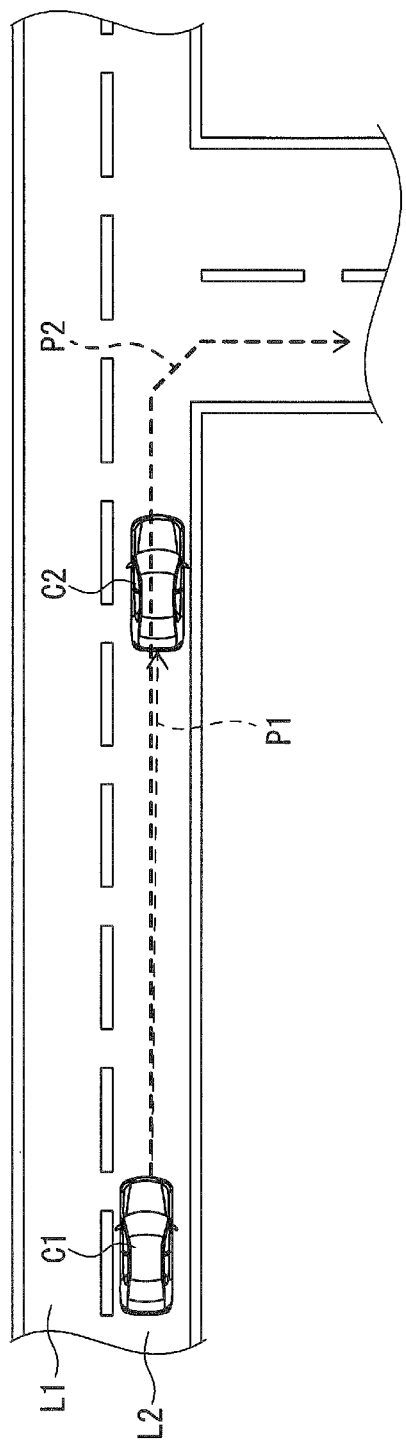
FIG. 8 is a schematic diagram illustrating a case of switching traveling paths when decelerating.

FIG. 8 illustrates a case of generating the first traveling path P1 based on the traveling trajectory of the preceding vehicle C2 and the second traveling path P2 based on the high-definition map, in which the second traveling path P2 is to turn to the right. The traveling path to follow is presumed to be switched from the first traveling path P1 to the second traveling path P2. When a speed (designed speed) when traveling on the second traveling path P2 is low, and the current speed of the host vehicle C1 following the first traveling path P1 based on the traveling trajectory of the preceding vehicle C2 differs from the speed when traveling on the second traveling path P2, switching from the first traveling path P1 to the second traveling path P2 leads to sudden deceleration, causing irregular behavior of the host vehicle C1. The travel assistance device according to the embodiment of the present invention thus executes the processing of switching from the first traveling path P1 to the second traveling path P2 while taking account of likeness between the current speed of the host vehicle C1 and the speed when traveling on the second traveling path P2.

The vehicle speed acquisition unit 14 acquires the current speed of the host vehicle C1 detected by the vehicle speed sensor 22. The vehicle speed acquisition unit 14 further acquires the speed (designed speed) designed for traveling on the second traveling path P2 generated by the second path generation unit 12. The designed speed when traveling on the second traveling path P2 may be calculated in accordance with information on a speed limit included in the navigation map information stored in the navigation map information storage unit 41 or the high-definition map information stored in the high-definition map information storage unit 42. Alternatively, the designed speed when traveling on the second traveling path P2 may be calculated in accordance with information on speeds of other vehicles around the host vehicle C1 detected by the periphery sensor 3. The designed speed when traveling on the second traveling path P2 may also be calculated in accordance with a road structure (road figure) acquired from the high-definition map information stored in the high-definition map information storage unit 42, or a road structure (road figure) included in the surroundings detected by the periphery sensor 3. The designed speed when traveling on the second traveling path P2 may be designed either constantly or differently in the entire section of the second traveling path P2.

The speed comparison unit 15 compares the current speed of the host vehicle C1 acquired by the vehicle speed acquisition unit 14 with the designed speed when traveling on the second traveling path P2 acquired by the vehicle speed acquisition unit 14 to determine whether the respective speeds have likeness, so as to determine whether the host vehicle C1 can change the current speed to follow the designed speed upon the traveling on the second traveling path P2 when switching from the first traveling path P1 to the second traveling path P2. In particular, the speed comparison unit 15 determines that the host vehicle C1 can change the current speed to follow the designed speed upon the traveling on the second traveling path P2 when the current speed of the host vehicle C1 and the designed speed upon the traveling on the second traveling path P2 have likeness, and determines that the host vehicle C1 cannot change the current speed to follow the designed speed upon the traveling on the second traveling path P2 when the current speed of the host vehicle C1 and the designed speed upon the traveling on the second traveling path P2 have no likeness.

For example, the speed comparison unit 15 calculates a difference between the current speed of the host vehicle C1 and the designed speed when traveling on the second traveling path P2 acquired by the vehicle speed acquisition unit 14. When an absolute value of the calculated difference is less than a predetermined threshold, the speed comparison unit 15 determines that the host vehicle C1 can change the current speed to follow the designed speed upon the traveling on the second traveling path P2 since the current speed of the host vehicle C1 and the designed speed upon the traveling on the second traveling path P2 have likeness. When the absolute value of the calculate difference is the predetermined threshold or greater, the speed comparison unit 15 determines that the host vehicle C1 cannot change the current speed to follow the designed speed upon the traveling on the second traveling path P2 since the current speed of the host vehicle C1 and the designed speed upon the traveling on the second traveling path P2 have no likeness. The predetermined threshold can be set as appropriate, and may be preliminarily stored in the storage device 4, for example.

Figure 9A:
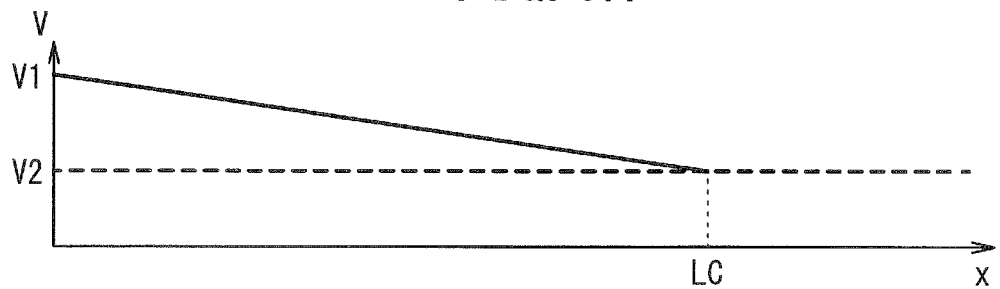
FIG. 9A is a graph illustrating a velocity profile of a first traveling path and a second traveling path.
Figure 9B:
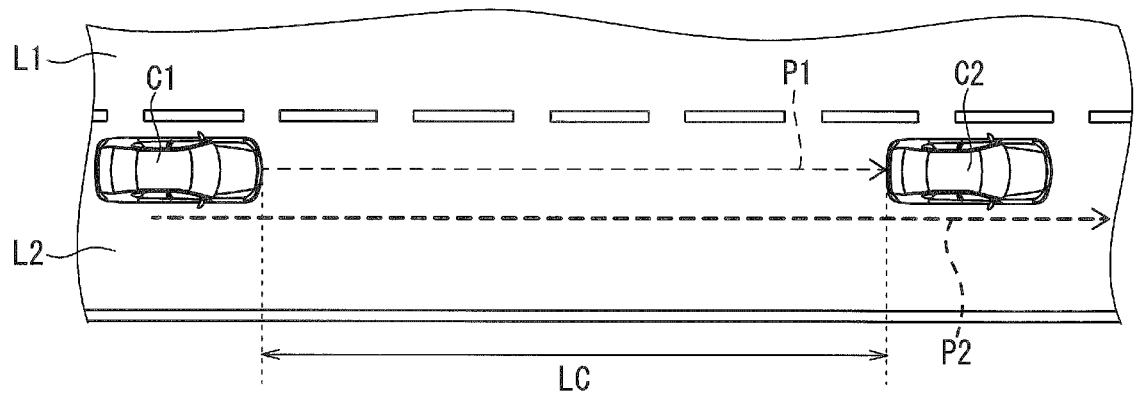
FIG. 9B is a schematic diagram illustrating an example of likeness determination processing when decelerating.

Alternatively, as illustrated in FIG. 9A and FIG. 9B, the speed comparison unit 15 calculates deceleration a necessary for decelerating from the current speed V1 of the host vehicle C1 to the designed speed V2 before reaching the farthest point from the current position of the host vehicle C1, in accordance with the current speed V1 of the host vehicle C1 acquired by the vehicle speed acquisition unit 14, a distance Lc from the current position of the host vehicle C1 to the farthest point in the section in which the first traveling path P1 and the second traveling path P2 overlap with each other, and the designed speed V2 upon the traveling on the second traveling path P2 at the farthest point. The speed comparison unit 15 determines that the host vehicle C1 can follow the designed speed when the calculated deceleration a is less than a predetermined threshold at, and determines that the host vehicle C1 cannot follow the designed speed when the calculated deceleration a is the predetermined threshold at or greater. The predetermined threshold at can be set as appropriate, and may be preliminarily stored in the storage device 4, for example.

While FIG. 9A and FIG. 9B illustrate the case of performing the deceleration control on the host vehicle C1, the acceleration control may be performed on the host vehicle C1 in the similar manner. In particular, when the current speed of the host vehicle C1 acquired by the vehicle speed acquisition unit 14 is lower than the designed speed upon the traveling on the second traveling path P2, and when the difference between the current speed of the host vehicle C1 and the designed speed upon the traveling on the second traveling path P2 is the predetermined threshold or greater, the speed comparison unit 15 calculates acceleration necessary for accelerating from the current speed of the host vehicle C1 to the designed speed. The speed comparison unit 15 determines that the host vehicle C1 can follow the designed speed when the calculated acceleration is less than a predetermined threshold (maximum acceleration). The speed comparison unit 15 determines that the host vehicle C1 can follow the designed speed when the calculated acceleration is less than the predetermined threshold, and determines that the host vehicle C1 cannot follow the designed speed when the calculated acceleration is the predetermined threshold or greater. The predetermined threshold can be set as appropriate, and may be preliminarily stored in the storage device 4, for example.

The path switch unit 16 determines whether the host vehicle C1 needs to switch the traveling path to follow by the travel assistance control from the first traveling path P1 on which the host vehicle C1 is currently traveling to the second traveling path P2 which is a possibility as a traveling path to follow. For example, when the second traveling path P2 is not generated by the second path generation unit 12 since the high-definition map information is not present in the road section ahead of the host vehicle C1, the path switch unit 16 determines that there is no need to switch the traveling path to follow. When the first traveling path P1 is based on the traveling trajectory of the preceding vehicle C2 and when the second traveling path P2 is generated, the path switch unit 16 determines that the traveling path to follow needs to be switched, since the preceding vehicle C2 could travel in a direction different from the direction toward the destination of the host vehicle C1. The path switch unit 16 may determine that the switch of the traveling path to follow is needed in every case in which the second traveling path P2 is generated.

The path switch unit 16 switches the traveling path to follow by the travel assistance control at a predetermined timing from the first traveling path P1 on which the host vehicle C1 is currently traveling to the second traveling path P2 which is a possibility as a traveling path to follow, in accordance with the determination result of the likeness between the first traveling path P and the second traveling path P2 by the path comparison unit 13, and the determination result of the likeness between the respective speeds by the speed comparison unit 15.

For example, when the path comparison unit 13 determines that the first traveling path P1 and the second traveling path P2 have likeness, and when the speed comparison unit 15 determines that the host vehicle C1 can change the current speed so as to follow the designed speed upon the traveling on the second traveling path P2, the path switch unit 16 may switch the traveling path to follow from the first traveling path P1 to the second traveling path P2. The path switch unit 16 may switch the traveling path to follow from the first traveling path P1 to the second traveling path P2 either when the path comparison unit 13 determines that the first traveling path P1 and the second traveling path P2 have likeness, or when the speed comparison unit 15 determines that the host vehicle C1 can change the current speed so as to follow the designed speed upon the traveling on the second traveling path P2. The path switch unit 16 may ask for approval from the occupant before switching the traveling path to follow from the first traveling path P1 to the second traveling path P2, and make a switch when receiving the permission.

When the path comparison unit 13 determines that the first traveling path P1 and the second traveling path P2 have no likeness, the path switch unit 16 is on standby without switching the traveling path to follow from the first traveling path P1 to the second traveling path P2. In particular, the preceding vehicle is presumed to travel substantially in the middle in the lane when the first traveling path P1 is generated on the basis of the traveling trajectory of the preceding vehicle. The second traveling path P2 generated typically passes through the middle in the lane. The path switch unit 16 presumes that the deviation between the first traveling path P1 and the second traveling path P2 can decrease to have likeness later even through the first traveling path P1 and the second traveling path P2 have no likeness at present, and is thus on standby until the path comparison unit 13 determines that the first traveling path P1 and the second traveling path P2 have likeness.

When the first traveling path P1 and the second traveling path P2 are determined to have likeness, the path switch unit 16 switches from the first traveling path P1 to the second traveling path P2 at a predetermined timing during traveling on the first traveling path P1 and the second traveling path P2 targeted upon the determination of likeness. For example, when making a determination of likeness in a predetermined section from the current position of the host vehicle C1 to a position having a predetermined distance, the path switch unit 16 may switch from the first traveling path P1 to the second traveling path P2 during traveling in the predetermined section. Alternatively, when making a determination of likeness at a predetermined position within the section in which the first traveling path P1 and the second traveling path P2 overlap with each other, the path switch unit 16 may switch the traveling path at a timing when reaching the predetermined position. For example, as illustrated in FIG. 5, when making a determination of likeness at a position ahead of the front-side gazing point having the distance L0 from the host vehicle C1, excluding the region having a distance from the current position of the host vehicle C1 shorter than the distance L0 of the front-side gazing point, the path switch unit 16 may switch the traveling path at a point when reaching the position ahead of the front-side gazing point having the distance L0 from the host vehicle C1.

The path switch unit 16 can switch the traveling path to follow from the second traveling path P2 to the first traveling path P1 after switching from the first traveling path P1 to the second traveling path P2. For example, the path switch unit 16 may switch the traveling path to follow from the second traveling path P2 to the first traveling path P1 when the host vehicle C1 enters a road section not covered by the high-definition map information or when the precision of the high-definition map information is lower than a predetermined threshold.

The presentation control unit 17 outputs a control signal for controlling a display 52 and a speaker 53 of the user I/F 5 so as to present guide information to the occupant in accordance with the result of switching of the traveling path by the path switch unit 16. The presentation control unit 17 may urge the occupant to travel on the first traveling path P1 before the path switch unit 16 switches from the first traveling path P1 to the second traveling path P2. The presentation control unit 17 may provide notice to the occupant when the path switch unit 16 switches from the first traveling path P1 to the second traveling path P2.

The user I/F 5 includes an input device 51, the display 52, and the speaker 53. Examples of the input device 51 include a switch, a button, a keyboard, a microphone, and a touch panel. The input device 51 receives, from the occupant, various kinds of information such as setting of destination of the host vehicle C1, instructions to switch between the autonomous driving and the manual driving, and permission to switch from the first traveling path P1 to the second traveling path P2. The display 52 may be a liquid crystal display (LCD), for example, and displays an image indicating text data or icons in accordance with the control signal from the presentation control unit 17. The speaker 53 outputs voice or a notification sound in accordance with the control signal from the presentation control unit 17.

The vehicle control device 7 calculates the control amount to control the actuator 6 based on the traveling path generated by the first path generation unit or the second path generation unit. The calculated control amount is sent to the actuator 6.

The vehicle control device 7 outputs a control signal for controlling the actuator 6 to travel on the first traveling path P1 before the path switch unit 16 switches the traveling path to follow from the first traveling path P1 to the second traveling path P2. The vehicle control device 7 may execute the autonomous driving to autonomously drive without the occupant involved in any operation, or execute the autonomous driving to control at least one of the driving, braking, and steering operations.

The vehicle control device 7 outputs a control signal for controlling the actuator 6 to travel on the second traveling path P2 when the path switch unit 16 switches the traveling path to follow from the first traveling path P1 to the second traveling path P2. The vehicle control device 7 may execute the autonomous driving to autonomously drive without the occupant involved in any operation, or execute the autonomous driving to control at least one of the driving, braking, and steering operations. The vehicle control device 7 may perform the acceleration/deceleration control on the host vehicle C1 so as to approximate the current speed of the host vehicle C1 to the designed speed upon the traveling on the second traveling path P2 before the path switch unit 16 switches the traveling path to follow from the first traveling path P1 to the second traveling path P2.

The actuator 6 controls the traveling state of the host vehicle C1 in accordance with the control signal from the vehicle control device 7. The actuator 6 includes a drive actuator 61, a brake actuator 62, and a steering actuator 63. The drive actuator 61 is an electronic control throttle valve, for example, and controls the accelerator of the host vehicle C1 to regulate an opening degree in accordance with the control signal from the vehicle control device 7. The brake actuator 62 is a hydraulic circuit, for example, and controls a braking operation of the brake of the host vehicle C1 in accordance with the control signal from the vehicle control device 7. The steering actuator 63 controls the steering of the host vehicle C1 in accordance with the control signal from the vehicle control device 7.

(Travel Assistance Method)

Figure 10:
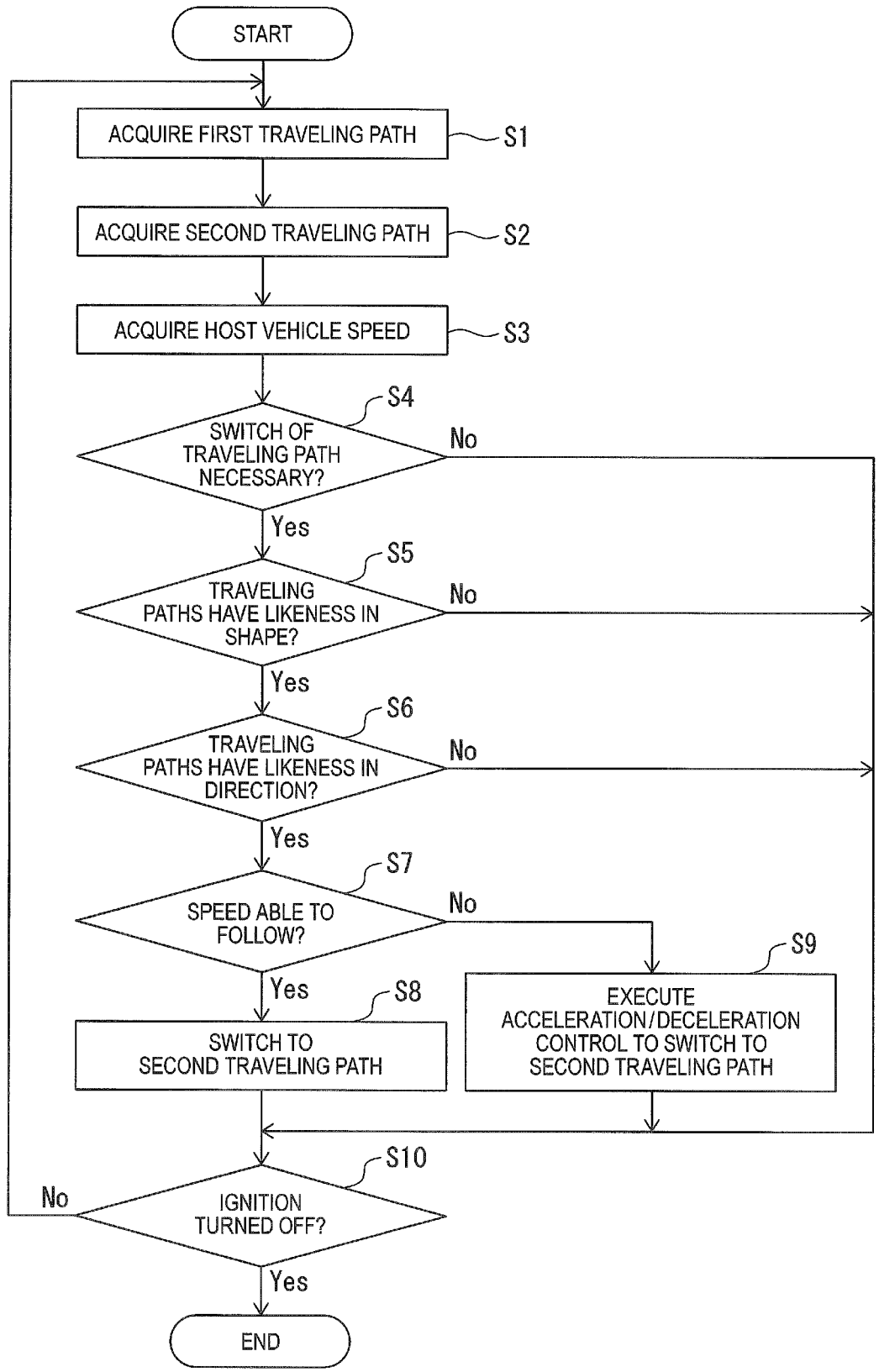
FIG. 10 is a flowchart illustrating a traveling assistance method according to the embodiment of the present invention.

A travel assistance method according to the embodiment of the present invention is illustrated below with reference to the flowchart in FIG. 10. The host vehicle C1 illustrated below is presumed to travel while following the first traveling path P1 generated by the first path generation unit 11.

In step S1, the periphery sensor 3 detects the surroundings of the host vehicle C1. The first path generation unit 11 generates the first traveling path P1 on which the host vehicle C1 is traveling, in accordance with the surroundings of the host vehicle C1 detected by the periphery sensor 3. For example, the first path generation unit 11 calculates the traveling trajectory of the preceding vehicle C2 detected by the periphery sensor 3, and generates the first traveling path P1 based on the calculated traveling trajectory of the preceding vehicle C2. The traveling trajectory of the preceding vehicle C2 is updated successively in association with the movement of the preceding vehicle C2, so that the first traveling path P1 is generated successively.

In step S2, the second path generation unit 12 generates the second traveling path P2 which is a possibility as a traveling path that the host vehicle C1 is to follow, in accordance with the high-definition map information stored in the high-definition map information storage unit 42. For example, the second path generation unit 12 extracts a road structure ahead of the host vehicle C1 from the high-definition map information stored in the high-definition map information storage unit 42, so as to generate the second traveling path P2 based on the extracted road structure.

In step S3, the vehicle speed sensor 22 successively detects a speed of the host vehicle C1. The vehicle speed acquisition unit 14 acquires the speed of the host vehicle C1 detected by the vehicle speed sensor 22. The periphery sensor 3 detects a designed speed when traveling on the second traveling path P2 generated by the second path generation unit 12. The vehicle speed acquisition unit 14 acquires the designed speed upon the traveling on the second traveling path P2 detected by the periphery sensor 3.

In step S4, the path switch unit 16 determines whether the host vehicle C1 needs to switch the traveling path to follow from the first traveling path P1 generated by the first path generation unit 11 to the second traveling path P2 generated by the second path generation unit 12. For example, the path switch unit 16 determines that there is no need to switch the traveling path to follow when the second traveling path P2 is not present, and determines that the traveling path needs to be switched when the second traveling path P2 is present. When the switch of the traveling path to follow is determined to be needed, the process proceeds to step S5.

In step S5 and step S6, the path comparison unit 13 executes the likeness determination processing of determining whether the first traveling path P1 generated by the first path generation unit 11 and the second traveling path P2 generated by the second path generation unit 12 have likeness. In step S5, the path comparison unit 13 determines whether the gap between the first traveling path P1 and the second traveling path P2 is less than a predetermined threshold, so as to make a determination of whether the first traveling path P1 and the second traveling path P2 have likeness in shape. The path comparison unit 13 may determine that the first traveling path P1 and the second traveling path P2 have no likeness when at least one of the first traveling path P1 and the second traveling path P2 has a length shorter than a predetermined threshold. When the gap between the first traveling path P1 and the second traveling path P2 is the predetermined threshold or greater, and the first traveling path P1 and the second traveling path P2 are thus determined to have no likeness in shape, the processing is on standby without switching from the first traveling path P1 to the second traveling path P2, and the process proceeds to step S10. When the gap between the first traveling path P1 and the second traveling path P2 is less than the predetermined threshold in step S5, the first traveling path P1 and the second traveling path P2 are determined to have likeness in shape, and the process proceeds to step S6.

In step S6, the path comparison unit 13 determines whether the angle between the respective tangents to the first traveling path P1 and the second traveling path P2 at the predetermined points having the shortest distance to each other is less than a predetermined threshold, so as to make a determination of whether the directions (orientations) of the first traveling path P1 and the second traveling path P2 have likeness. When the angle between the respective tangents is the predetermined threshold or greater, the directions (orientations) of the first traveling path P1 and the second traveling path P2 are determined to have no likeness to lead the processing to be on standby without switching from the first traveling path P1 to the second traveling path P2, and the process proceeds to step S10. When the angle between the respective tangents is less than the predetermined threshold in step S6, the directions (orientations) of the first traveling path P1 and the second traveling path P2 are determined to have likeness, and the process proceeds to step S7.

In step S7, the speed comparison unit 15 compares the current speed of the host vehicle C1 with the designed speed upon the traveling on the second traveling path P2 acquired by the vehicle speed acquisition unit 14 to determine whether the respective speeds have likeness, so as to determine whether the host vehicle C1 can change the current speed to follow the designed speed upon the traveling on the second traveling path P2 when switching from the first traveling path P1 to the second traveling path P2. For example, the speed comparison unit 15 determines that the respective speeds have likeness and that the host vehicle C1 can follow the designed speed when the difference between the current speed of the host vehicle C1 and the designed speed upon the traveling on the second traveling path P2 is less than a predetermined threshold, and determines that the respective speeds have no likeness and that the host vehicle C1 cannot follow the designed speed when the difference between the current speed of the host vehicle C1 and the designed speed upon the traveling on the second traveling path P2 is the predetermined threshold or greater. The process proceeds to step S8 when the host vehicle C1 is determined to be able to follow the designed speed.

In step S8, the path switch unit 16 switches the traveling path as a target that the host vehicle C1 follows from the first traveling path P1 to the second traveling path P2 at a predetermined timing. The vehicle control device 7 performs the travel assistance control on the host vehicle C1 so as to follow the second traveling path P2. The vehicle control device 7 performs the acceleration/deceleration control on the host vehicle C1 to approximate the current speed of the host vehicle C1 to the designed speed so as to change the current speed of the host vehicle C1 to the designed speed upon the traveling on the second traveling path P2.

When the host vehicle C1 is determined not to be able to follow the designed speed in step S7, the process proceeds to step S9. In step S9, the acceleration/deceleration control is performed on the host vehicle C1 to approximate the current speed of the host vehicle C1 to the designed speed so that the host vehicle C1 can change the current speed to follow the designed speed upon the traveling on the second traveling path P2. The acceleration/deceleration control is performed on the host vehicle C1 to approximate the speed of the host vehicle C1 to the designed speed so that the traveling path to follow is switched to the second traveling path P2 at the point when the speed of the host vehicle C1 reaches an allowable speed to follow the designed speed. When the acceleration or the deceleration necessary for allowing the host vehicle C1 to change the current speed so as to follow the designed speed upon the traveling on the second traveling path P2 is a predetermined threshold or greater, the processing may be on standby without switching from the first traveling path P1 to the second traveling path P2.

In step S10, the ignition is determined whether to be turned off. The process ends when the ignition is determined to be turned off. The process returns to step S1 when the ignition is determined not to be turned off yet. When the path comparison unit 13 determines that the first traveling path P1 and the second traveling path P2 have no likeness in either step S5 or step S6, the first path generation unit 11 may generate the first traveling path P1 again in step S1 after step S10 so that the first traveling path P1 has likeness to the second traveling path P2. For example, generating the first traveling path P1 again by the first path generation unit 11 in the same manner as the previous step S1 increases the probability of leading the first traveling path P1 to have likeness to the second traveling path P2 in association with the movement of the host vehicle C1 and the preceding vehicle. Alternatively, the first path generation unit 11 may lead the first traveling path P1 to be offset so as to decrease the amount of deviation from the second traveling path P2 as the distance from the host vehicle C1 increases.

Advantageous Effects

According to the embodiment of the present invention, the first path generation unit 11 generates the first traveling path P1 on which the host vehicle is following, and the vehicle control device 7 performs the travel assistance control on the host vehicle based on the first traveling path P1. The second path generation unit 12 also generates the second traveling path P2 based on the high-definition map information around the circumference of the host vehicle, and the path comparison unit 13 determines whether the first traveling path P1 and the second traveling path P2 have likeness. When the first traveling path P1 and the second traveling path P2 are determined to have likeness, the path switch unit 16 switches the traveling path as a target that the host vehicle follows from the first traveling path P1 to the second traveling path P2. Switching the traveling path when the first traveling path P1 and the second traveling path P2 have likeness and the amount of mutual deviation is small, can prevent irregular behavior such as wandering upon the switch.

If the path switch unit 16 switches the traveling path as a target that the host vehicle follows from the first traveling path P1 to the second traveling path P2 while the first traveling path P1 and the second traveling path P2 have no likeness, the traveling path would be switched when the amount of mutual deviation is large, which may cause irregular behavior such as wandering upon the switch. Further, switching the traveling path as a target that the host vehicle follows from the first traveling path P1 to the second traveling path P2 while the first traveling path P1 and the second traveling path P2 have no likeness requires a longer traveling distance to switch from the first traveling path P1 to the second traveling path P2. The increase in the traveling distance required for the switch from the first traveling path P1 to the second traveling path P2 further requires a precise control target and switch path to be generated continuously to a position distant from the host vehicle in order to prevent irregular behavior such as wandering upon the switch. The increase in the traveling distance also requires accurate acquisition of the surrounding conditions continuously to a position distant from the host vehicle. The continuous generation of the precise control target and switch path and the continuous accurate acquisition of the surrounding conditions to a position distant from the host vehicle would be difficult to achieve depending on the surrounding conditions of the host vehicle or the capacity of the sensors. Such a situation increases the probability of causing irregular behavior such as wandering upon the switch. According to the present embodiment, the traveling path can be switched when the first traveling path P1 and the second traveling path P2 have likeness and the amount of mutual deviation is small, so as to prevent irregular behavior such as wandering upon the switch.

The processing circuit 1 determines the presence or absence of the high-definition map information so as to cover the road on which the host vehicle is traveling, and generates the second traveling path based on the high-definition map information determined to be present around the circumference of the host vehicle when the high-definition map information is present. The traveling path thus can be switched from the first traveling path P1 to the second traveling path P2 when the high-definition map information is present. The determination of the presence or absence of the high-definition map information enables the switch from the first traveling path P1 to the second traveling path P2 reliably after entering the road covered by the high-definition map information. The determination of the presence or absence of the high-definition map information may be performed at predetermined intervals (100 ms, for example).

The path comparison unit 13 determines that the first traveling path P1 and the second traveling path P2 have likeness when the gap between the first traveling path P1 and the second traveling path P2 is less than a predetermined threshold. The determination based on the gap between the first traveling path P1 and the second traveling path P2 can allow the traveling path to be switched when the amount of deviation between the first traveling path P1 and the second traveling path P2 is small, so as to prevent irregular behavior such as wandering upon the switch.

The path comparison unit 13 determines whether the gap between the first traveling path P1 and the second traveling path P2 is less than a predetermine threshold in the section ahead of the front-side gazing point having the distance L0 from the host vehicle C1, as illustrated in FIG. 5. Setting the section ahead of the front-side gazing point as a control target enables continuous consideration to stability, so as to achieve stable traveling after the switch, as compared with a case of focusing on a momentary control amount. The calculation load can also be reduced as compared with a case of determining the gap between the first traveling path P1 and the second traveling path P2 in the entire section including the region from a position behind the front-side gazing point having the distance L0 to the host vehicle C1.

The path comparison unit 13 determines that the first traveling path P1 and the second traveling path P2 have likeness when the angle θ is less than a predetermined threshold between the tangent LA to the first traveling path P1 at the point p1 and the tangent LB to the second traveling path P2 at the point p2 having the shortest distance to the point p1, as illustrated in FIG. 7. The traveling path thus can be switched from the first traveling path P1 to the second traveling path P2 when the directions (orientations) of the first traveling path P1 and the second traveling path P2 have likeness, so as to achieve a smooth switch from the first traveling path P1 to the second traveling path P2 while avoiding a sudden switch from a curved section to a straight section, for example.

When the path comparison unit 13 determines that the first traveling path P1 and the second traveling path P2 have no likeness, the first path generation unit 11 generates the first traveling path P1 again so that the first traveling path P1 and the second traveling path P2 have likeness to meet the switching condition. This can prevent the host vehicle from resulting in a failure to switch from the first traveling path P1 to the second traveling path P2.

The current speed of the host vehicle C1 and the designed speed when traveling on the second traveling path P2 are determined whether to have likeness, so as to determine whether the host vehicle C1 can change the current speed to follow the designed speed upon the traveling on the second traveling path P2 when switching from the first traveling path P1 to the second traveling path P2. When the host vehicle C1 is determined to be able to change the current speed to follow the designed speed upon the traveling on the second traveling path P2, the first traveling path P1 is switched to the second traveling path P2. This enables the smooth switch from the first traveling path P1 to the second traveling path P2 also in terms of speed.

When the host vehicle C1 is determined not to be able to change the current speed to follow the designed speed upon the traveling on the second traveling path P2, the acceleration/deceleration control is performed on the host vehicle C1 so as to approximate the speed of the host vehicle C1 to the designed speed upon the traveling on the second traveling path P2 before switching from the first traveling path P1 to the second traveling path P2. The acceleration/deceleration control is also performed upon the determination that the traveling path cannot be switched, so as to reduce the probability of resulting in a failure to switch the traveling path accordingly.

The current speed of the host vehicle C1 is compared with the designed speed upon the traveling on the second traveling path P2 at the farthest point from the host vehicle C1 in either the first traveling path P1 or the second traveling path P2 having a shorter distance, so as to determine that the host vehicle C1 can follow the designed speed when the acceleration or the deceleration necessary for changing the current speed of the host vehicle C1 to the designed speed is less than a predetermined threshold. Since the traveling path is switched when the acceleration/deceleration control is performed so as to allow the host vehicle C1 to follow the designed speed before reaching the farthest point from the host vehicle C1 in either the first traveling path P1 or the second traveling path P2 with the shorter distance, sudden acceleration or deceleration can be avoided, achieving a smooth switch.

Modified Examples

Figure 11A:
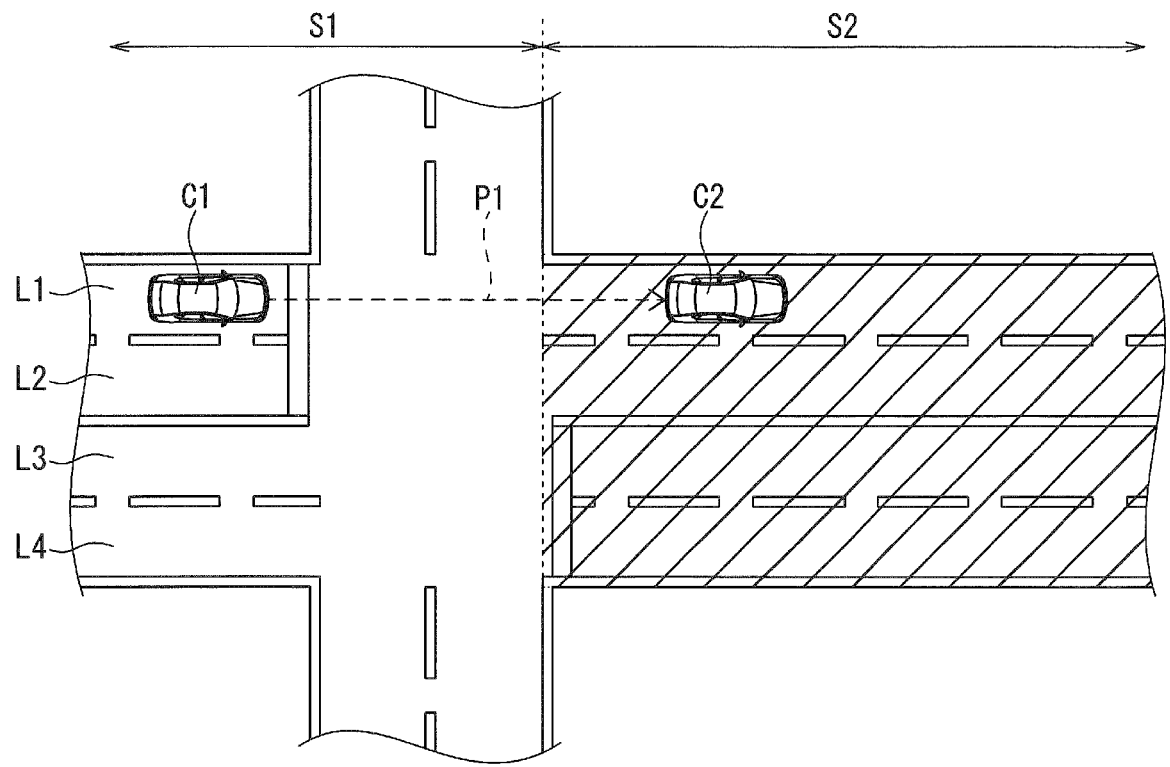
FIG. 11A is a schematic diagram illustrating a case of switching traveling paths at an intersection.

The embodiment of the present invention is further illustrated below with modified examples in which the host vehicle traveling in a section not covered by the high-definition map information is entering a section covered by the high-definition map information. FIG. 11A illustrates a case in which a road with two lanes in each direction, including lanes L1, L2, L3, and L4 parallel to each other, intersects with another road at an intersection. The case illustrated in FIG. 11A includes a section 51 not covered by the high-definition map information in front of the intersection (a region without crosshatching), and a section S2 covered by the high-definition map information ahead of the intersection (a region provided with crosshatching). The first path generation unit 11 generates the first traveling path P1 based on the traveling trajectory of the preceding vehicle C2 when the host vehicle C1 is traveling in the section 51 not covered by the high-definition map information. The second path generation unit 12 does not generate the second traveling path P2 because of no high-definition map information. The path switch unit 16 determines that the host vehicle C1 does not need to switch the traveling path to follow from the first traveling path P1 to the second traveling path P2. The host vehicle C1 is traveling while following the first traveling path P1.

Figure 11B:
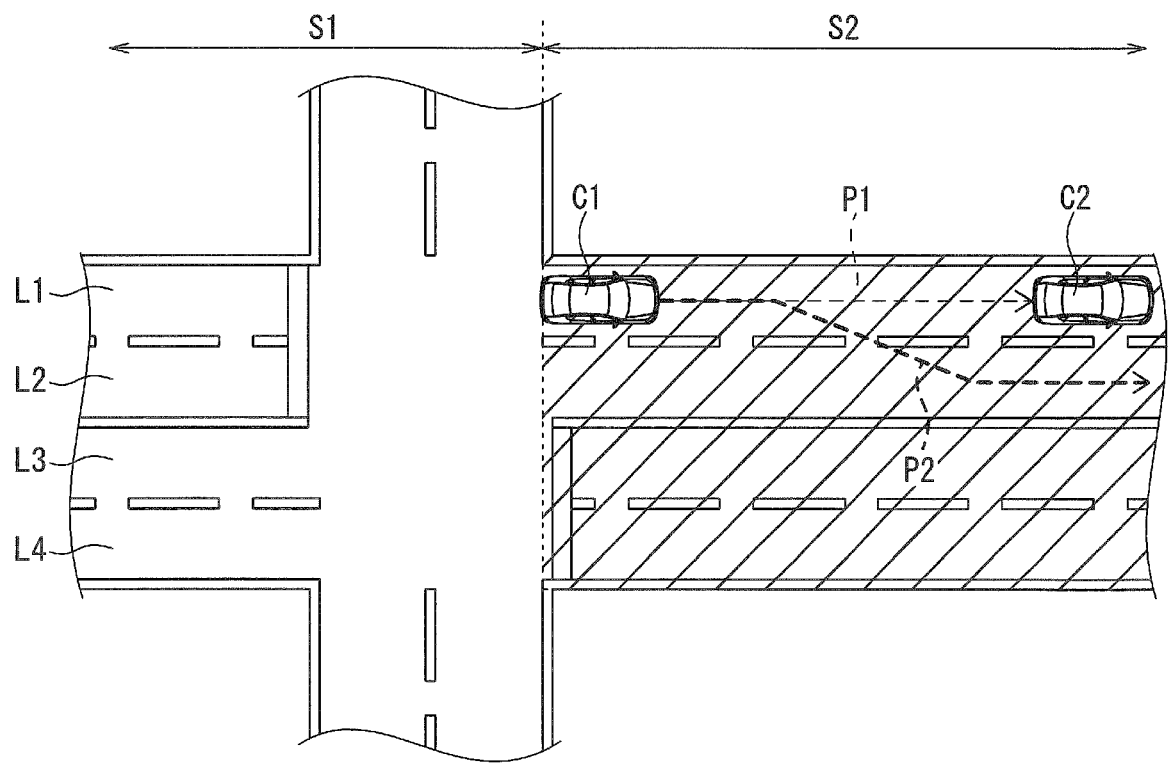
FIG. 11B is a schematic diagram, continued from FIG. 11A, illustrating the case of switching the traveling paths.

As illustrated in FIG. 11B, the host vehicle C1 traveling in the section S1 not covered by the high-definition map information then enters the section S2 covered by the high-definition map information. The first path generation unit 11 keeps generating the first traveling path P1 based on the traveling trajectory of the preceding vehicle C2. The second path generation unit 12 generates the second traveling path P2 since the high-definition map information is present. The path switch unit 16 determines that the switch of the traveling path to follow from the first traveling path P1 to the second traveling path P2 is needed. The path comparison unit 13 determines whether the first traveling path P1 and the second traveling path P2 have likeness. When the first traveling path P1 and the second traveling path P2 are determined to have likeness, the path switch unit 16 switches the traveling path to follow from the first traveling path P1 to the second traveling path P2.

Figure 12A:
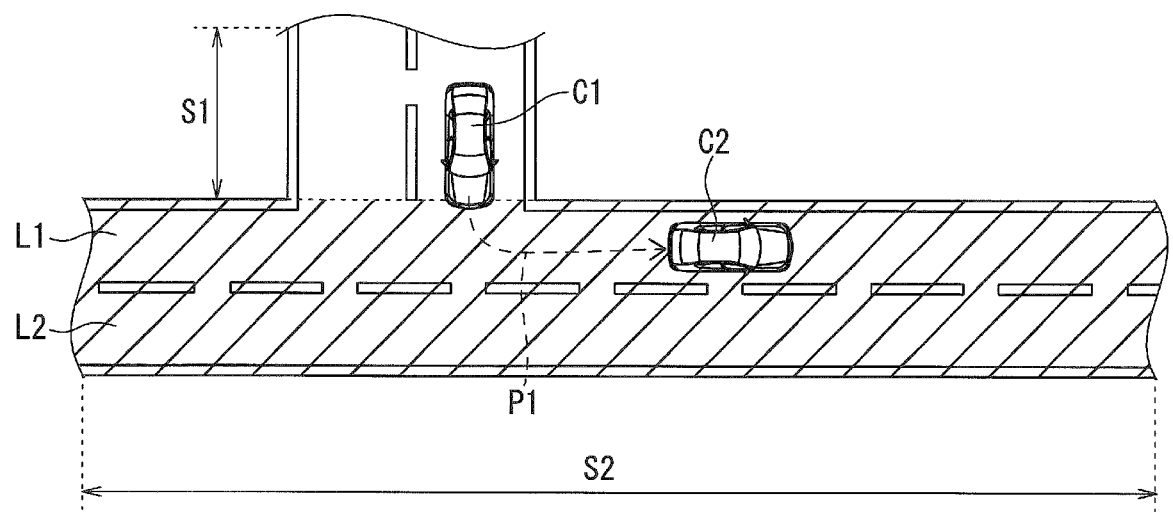
FIG. 12A is a schematic diagram illustrating a case of switching traveling paths when making a turn.

FIG. 12A illustrates a case in which the host vehicle C1 is making a left turn at an intersection (T-intersection) while following the preceding vehicle C2. The first path generation unit 11 generates the first traveling path P1 based on the traveling trajectory of the preceding vehicle C2 when the host vehicle C1 is traveling in the section 51 not covered by the high-definition map information (the region without crosshatching). The second path generation unit 12 does not generate the second traveling path P2 because of no high-definition map information. The path switch unit 16 determines that the host vehicle C1 does not need to switch the traveling path to follow from the first traveling path P1 to the second traveling path P2. The host vehicle C1 is traveling while following the first traveling path P1.

Figure 12B:
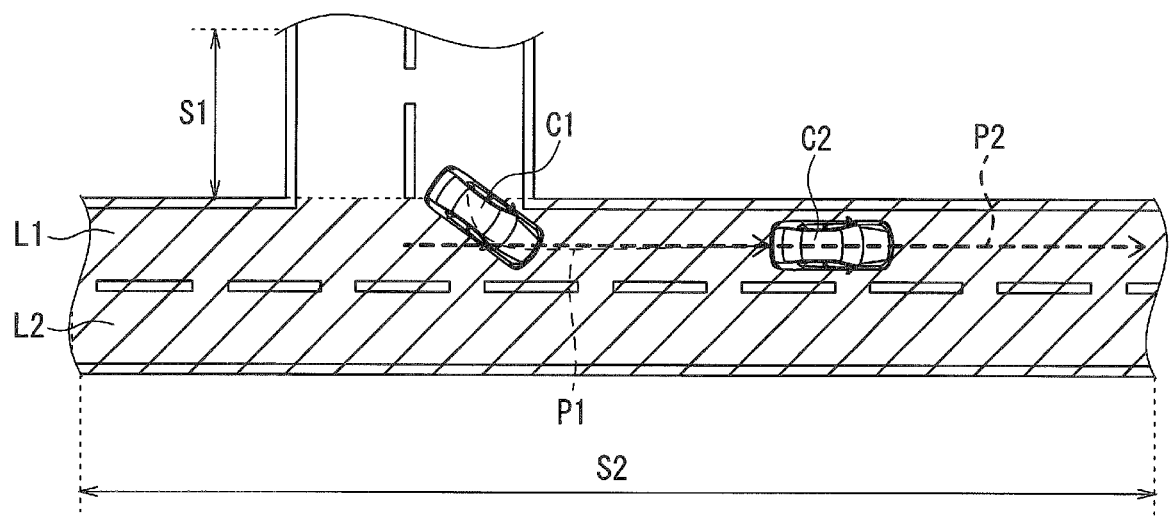
FIG. 12B is a schematic diagram, continued from FIG. 12A, illustrating the case of switching the traveling paths.

As illustrated in FIG. 12B, the host vehicle C1 traveling in the section 51 not covered by the high-definition map information then turns to the left to enter the section S2 covered by the high-definition map information (the region provided with the crosshatching). The first path generation unit 11 keeps generating the first traveling path P1 based on the traveling trajectory of the preceding vehicle C2. The second path generation unit 12 generates the second traveling path P2 since the high-definition map information is present. The path switch unit 16 determines that the switch of the traveling path to follow from the first traveling path P1 to the second traveling path P2 is needed. The path comparison unit 13 determines whether the first traveling path P1 and the second traveling path P2 have likeness.

When the first traveling path P1 and the second traveling path P2 are determined to have likeness, the path switch unit 16 switches the traveling path to follow from the first traveling path P1 to the second traveling path P2.

Figure 13A:
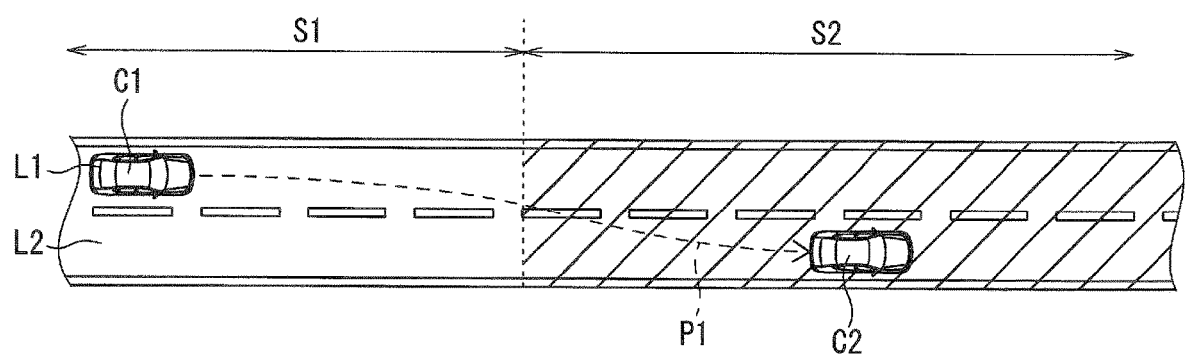
FIG. 13A is a schematic diagram illustrating a case of switching traveling paths when changing lanes.

FIG. 13A illustrates a case in which the host vehicle C1 traveling on a road with two lanes is making a lane change from the lane L1 on the left side to the lane L2 on the right side while following the preceding vehicle C2. The first path generation unit 11 generates the first traveling path P1 based on the traveling trajectory of the preceding vehicle C2 when the host vehicle C1 is traveling in the section S1 not covered by the high-definition map information (the region without crosshatching). The second path generation unit 12 does not generate the second traveling path P2 because of no high-definition map information. The path switch unit 16 determines that the host vehicle C1 does not need to switch the traveling path to follow from the first traveling path P1 to the second traveling path P2. The host vehicle C1 is traveling while following the first traveling path P1.

Figure 13B:
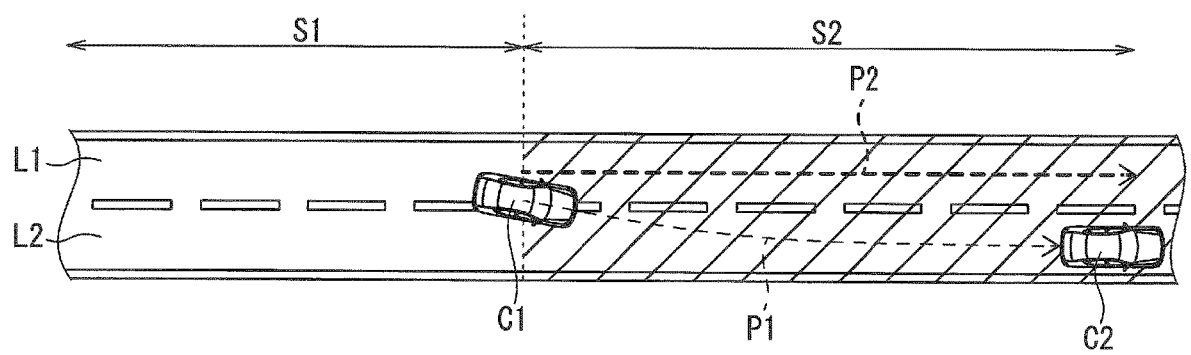
FIG. 13B is a schematic diagram, continued from FIG. 13A, illustrating the case of switching the traveling paths.

As illustrated in FIG. 13B, the host vehicle C1 traveling in the section S1 not covered by the high-definition map information then enters the section S2 covered by the high-definition map information (the region provided with the crosshatching). The first path generation unit 11 keeps generating the first traveling path P1 based on the traveling trajectory of the preceding vehicle C2. The second path generation unit 12 generates the second traveling path P2 since the high-definition map information is present. The path switch unit 16 determines that the switch of the traveling path to follow from the first traveling path P1 to the second traveling path P2 is needed. The path comparison unit 13 determines whether the first traveling path P1 and the second traveling path P2 have likeness. When the first traveling path P1 and the second traveling path P2 are determined to have likeness, the path switch unit 16 switches the traveling path to follow from the first traveling path P1 to the second traveling path P2.

According to the modified examples of the embodiment of the present invention, switching from the first traveling path P1 to the second traveling path P2 can be made smoothly when the host vehicle traveling in the section 51 not covered by the high-definition map information enters the section S2 covered by the high-definition map information. While the respective modified examples of the embodiment of the present invention have been illustrated with the case of generating the second traveling path P2 after entering the section S2 covered by the high-definition map information, the second traveling path P2 may be generated before entering the section S2 covered by the high-definition map information so as to execute the processing of determining the likeness between the first traveling path P1 and the second traveling path P2. When the first traveling path P1 and the second traveling path P2 are preliminarily determined to have likeness at a point at which the section S1 not covered by the high-definition map information is switched to the section S2 covered by the high-definition map information, the first traveling path P1 may be switched to the second traveling path P2 immediately after the host vehicle C1 enters the section S2 covered by the high-definition map information.

Other Embodiments

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

For example, the host vehicle C1 may travel on a road having a predetermined road structure, such as an intersection requiring a right or left turn, requiring a stop in front of a stop line, having a traffic signal, or causing many vehicles to be crowding, which is difficult or impossible to travel by following the first traveling path P1 based on the trajectory of the preceding vehicle C2 or the surroundings detected by the periphery sensor 3, and causes increasing a detection load of the periphery sensor 3. When traveling on the road having such a predetermined road structure, following the second traveling path P2 based on the high-definition map information can be effective. Switching from the first traveling path P1 to the second traveling path P2 in the predetermined road structure in which the second traveling path P2 is effective can achieve stable traveling, and can further reduce the detection load of the periphery sensor 3. When traveling on a road having a road structure relatively easy to follow, such as an expressway, the host vehicle C1 could follow the first traveling path P1 based on the trajectory of the preceding vehicle C2 or the surroundings of the host vehicle C1 detected by the periphery sensor 3. However, following the second traveling path P2 based on the high-definition map information can ensure more stable traveling, while reducing the detection load of the periphery sensor 3.

It should be understood that the present invention includes various embodiments not disclosed herein. Therefore, the technical scope of the present invention is defined only by the subject matter according to the claims reasonably derived from the foregoing descriptions.

REFERENCE SIGNS LIST

1 PROCESSING CIRCUIT
2 VEHICLE SENSOR
3 PERIPHERY SENSOR
4 STORAGE DEVICE
5 USER I/F
6 ACTUATOR
7 VEHICLE CONTROL DEVICE
11 FIRST PATH GENERATION UNIT
12 SECOND PATH GENERATION UNIT
13 PATH COMPARISON UNIT
14 VEHICLE SPEED ACQUISITION UNIT
15 SPEED COMPARISON UNIT
16 PATH SWITCH UNIT
17 PRESENTATION CONTROL UNIT
21 GNSS RECEIVER
22 VEHICLE SPEED SENSOR
23 ACCELERATION SENSOR
24 GYRO SENSOR
31 CAMERA
32 RADAR
33 COMMUNICATION DEVICE
41 NAVIGATION MAP INFORMATION STORAGE UNIT
42 HIGH-DEFINITION MAP INFORMATION STORAGE UNIT
51 INPUT DEVICE
52 DISPLAY
53 SPEAKER
61 DRIVE ACTUATOR
62 BRAKE ACTUATOR
63 STEERING ACTUATOR

The invention claimed is:

1. A travel assistance method comprising:
   detecting surroundings of a host vehicle;
   generating a first traveling path based on the surroundings;
   executing travel assistance control of the host vehicle based on the first traveling path;
   generating a second traveling path based on map information around a circumference of the host vehicle;
   determining a gap between the first traveling path and the second traveling path;
   when the gap is less than a predetermined threshold, determining that the first traveling path and the second traveling path have likeness and switching a traveling path that the host vehicle is caused to follow by the travel assistance control from the first traveling path to the second traveling path; and
   when the gap is the predetermined threshold or greater, determining that the first traveling path and the second traveling path have no likeness and maintaining the first traveling path that the host vehicle is caused to follow.

2. The travel assistance method of claim 1, further comprising:
   generating the first traveling path again when the first traveling path and the second traveling path are determined to have no likeness.

3. The travel assistance method of claim 1, wherein the first traveling path is switched to the second traveling path when the host vehicle travels on a road structure difficult or impossible to travel by following the first traveling path.

4. The travel assistance method of claim 1, further comprising determining whether the map information is present covering a road on which the host vehicle is traveling,
   wherein the second traveling path based on the map information around the circumference of the host vehicle is generated when the map information is present.

5. The travel assistance method of claim 1, wherein the gap is determined whether to be less than the predetermined threshold at a point having a distance from the host vehicle greater than or equal to a distance of a front-side gazing point.

6. A travel assistance method comprising:
   detecting surroundings of a host vehicle;
   generating a first traveling path based on the surroundings; and
   executing travel assistance control of the host vehicle based on the first traveling path;
   generating a second traveling path based on map information around a circumference of the host vehicle;
   determining that the first traveling path and the second traveling path have likeness or no likeness; and
   switching a traveling path that the host vehicle is caused to follow by the travel assistance control from the first traveling path to the second traveling path when the first traveling path and the second traveling path are determined to have likeness,
   wherein the first traveling path and the second traveling path are determined to have likeness when an angle between tangents to the first and second traveling paths at points having a minimum distance to each other is less than a predetermined threshold.

7. The travel assistance method comprising:
   detecting surroundings of a host vehicle;
   generating a first traveling path based on the surroundings;
   executing travel assistance control of the host vehicle based on the first traveling path;
   generating a second traveling path based on map information around a circumference of the host vehicle;
   determining that the first traveling path and the second traveling path have likeness or no likeness;
   switching a traveling path that the host vehicle is caused to follow by the travel assistance control from the first traveling path to the second traveling path when the first traveling path and the second traveling path are determined to have likeness;
   acquiring a current speed of the host vehicle and a designed speed when traveling on the second traveling path;
   determining whether the host vehicle can change the current speed to follow the designed speed upon switching from the first traveling path to the second traveling path; and
   switching from the first traveling path to the second traveling path when the host vehicle is determined to be able to follow the designed speed.

8. The travel assistance method of claim 7, further comprising performing acceleration/deceleration control on the host vehicle so as to approximate the current speed to the designed speed before switching from the first traveling path to the second traveling path when the host vehicle is determined not to be able to follow the designed speed.

9. The travel assistance method of claim 7, wherein the host vehicle is determined to be able to follow the designed speed at a point farthest from the host vehicle when acceleration or deceleration is less than a predetermined threshold, necessary for changing the current speed to the designed speed before reaching the farthest point in a section in which the first and second traveling paths overlap with each other.

10. A travel assistance device comprising:
    a sensor configured to detect surroundings of a host vehicle;
    a first path generation unit configured to generate a first traveling path based on the surroundings, the device being configured to execute travel assistance control of the host vehicle based on the first traveling path;
    a second path generate unit configured to generate a second traveling path based on map information around a circumference of the host vehicle; and
    a processing circuit configured to:
       determine a gap between the first traveling path and the second traveling path;
       when the gap is less than a predetermined threshold, determine that the first traveling path and the second traveling path have likeness and switch a traveling path that the host vehicle is caused to follow by the travel assistance control from the first traveling path to the second traveling path; and
       when the gap is the predetermined threshold or greater, determine that the first traveling path and the second traveling path have no likeness and maintain the first traveling path that the host vehicle is caused to follow.

* * * * *